United States Patent [19]

Fukunaga

[11] Patent Number: 4,924,409
[45] Date of Patent: May 8, 1990

[54] IMAGE PROCESSING APPARATUS WHEREIN CHARACTER STRING PROCESSING CAN BE PERFORMED ON A DISPLAY SCREEN

[75] Inventor: Kouji Fukunaga, Tokyo, Japan

[73] Assignee: Canon Kabushiki Kasiah, Tokyo, Japan

[21] Appl. No.: 394,317

[22] Filed: Aug. 11, 1989

Related U.S. Application Data

[63] Continuation of Ser. No. 88,544, Aug. 20, 1987, abandoned, which is a continuation of Ser. No. 673,157, Nov. 19, 1984, abandoned.

[30] Foreign Application Priority Data

| | | | |
|---|---|---|---|
| Nov. 22, 1983 | [JP] | Japan | 58-218729 |
| Nov. 22, 1983 | [JP] | Japan | 58-218730 |
| Nov. 22, 1983 | [JP] | Japan | 58-218731 |
| Nov. 22, 1983 | [JP] | Japan | 58-218732 |

[51] Int. Cl.$^5$ .................. G06F 3/02; G06F 15/20; G09G 1/06
[52] U.S. Cl. .................. 364/518; 364/900; 364/943; 364/943.1; 340/750
[58] Field of Search ... 364/518, 519, 521, 200 MS File, 364/900 MS File; 340/709, 711, 750, 798, 799, 706; 400/63, 76, 83, 279

[56] References Cited

U.S. PATENT DOCUMENTS

| | | | |
|---|---|---|---|
| 3,911,404 | 10/1975 | O'Neill, Jr. | 364/900 |
| 3,930,237 | 12/1975 | Villers | 364/518 X |
| 3,974,493 | 8/1976 | de Cavaignac et al. | 364/900 X |
| 4,040,024 | 8/1977 | Cowe et al. | 364/900 |
| 4,057,849 | 11/1977 | Ying et al. | 364/200 |
| 4,131,949 | 12/1978 | Fletcher et al. | 364/900 |
| 4,194,197 | 3/1980 | Bodin | 340/798 X |
| 4,195,353 | 3/1980 | Abe et al. | 364/900 |
| 4,425,629 | 1/1984 | Cason et al. | 364/900 |
| 4,445,194 | 4/1984 | Cason et al. | 364/900 |
| 4,488,254 | 12/1984 | Ward | 364/900 |

Primary Examiner—Joan H. Pendegrass
Attorney, Agent, or Firm—Fitzpatrick, Cella, Harper & Scinto

[57] ABSTRACT

There is an image processing apparatus which can perform the character processing works of character string on a display screen such as a CRT. This apparatus has: a keyboard having a special function input section to input a special code and a normal character input section to input normal code information different from the special code; a first memory to continuously store, as addresses, the special code inputted by the keyboard to display information on the basis of the codes stored in the first memory; a second memory to store the positional information regarding the special code; and a controller to control the display for allowing predetermined information to be displayed on the display on the basis of the special code stored in the first memory. The above special code may include either of carriage return code, tab code, centering code, gathering code, and space code. With this apparatus, the input and edit proceedings of new characters can be easily executed at any positions on the CRT by use of a buffer memory of a small capacity, so that the use efficiency of the memory is improved.

7 Claims, 40 Drawing Sheets

| | CCR | |
|---|---|---|
| CR - X | | 8 |
| CR - Y | | 1 |

| DSR - POSI | 9 |
|---|---|

| | DSR-INF |
|---|---|
| INF - CR | 1 |
| INF - CN | 0 |
| INF - GH | 0 |
| INF - TB | 0 |
| INF - ID | 0 |
| INF - AW | 0 |
| INF - POSI | 8 |

| | DSR-FORM |
|---|---|
| FOM - LM | 0 |
| FOM - RM | 39 |
| FOM - ID | 0 |
| FOM - TB (0) | 4 |
| FOM - TB (1) | 9 |
| FOM - TB (2) | 14 |
| FOM - TB (3) | |
| FOM - TB (4) | |
| ⋮ | |
| FOM - TB (n) | |
| TB - LEN | 0 |

FIG. 13

| | CCR |
|---|---|
| CR - X | 1 |
| CR - Y | 2 |

| | |
|---|---|
| DSR - POSI | 10 |

| | DSR-INF |
|---|---|
| INF - CR | 0 |
| INF - CN | 0 |
| INF - GH | 0 |
| INF - TB | 1 |
| INF - ID | 0 |
| INF - AW | 0 |
| INF - POSI | 1 |

| | DSR-FORM |
|---|---|
| FOM - LM | 0 |
| FOM - RM | 39 |
| FOM - ID | 0 |
| FOM - TB (0) | 4 |
| FOM - TB (1) | 9 |
| FOM - TB (2) | 14 |
| FOM - TB (3) | |
| FOM - TB (4) | |
| FOM - TB (n) | |
| TB - LEN | 4 |

FIG. 18

| | CCR | |
|---|---|---|
| CR - X | | 8 |
| CR - Y | | 0 |

| | | |
|---|---|---|
| DSR - POSI | | 0 |

| | DSR-INF | |
|---|---|---|
| INF - CR | | 0 |
| INF - CN | | 2 |
| INF - GH | | 0 |
| INF - TB | | 0 |
| INF - ID | | 0 |
| INF - AW | | 0 |
| INF - POSI | | 5 |
| INF - CPOSI | | 14 |

| | DSR-FORM | |
|---|---|---|
| FOM - LM | | 0 |
| FOM - RM | | 39 |
| FOM - ID | | 0 |
| FOM - TB(0) | | 4 |
| FOM - TB(1) | | 9 |
| FOM - TB(2) | | 14 |
| FOM - TB(3) | | |
| FOM - TB(4) | | |
| FOM - TB(n) | | |
| TB - LEN | | 0 |

FIG. 19

```
FML → L . . t . . t . . t . . . . . . . . . . . . . . . . R
DL1
DL2              △ FREEBIE ▽
DL3        At Lockheed Corp., whose very name
DL4        was synonymous payoffs and freebies for
DL5        foreign officials in the 1970s, the
DL6        company now no longer picks up even
DL7        hotel bills for customers. ▽
DL8     ▽
DL9                                △ TIME '81 March 6
DL10    ▽
DL11    ▽
DL12    ▽
```

CR(1) points to the "A" at the start of DL3.

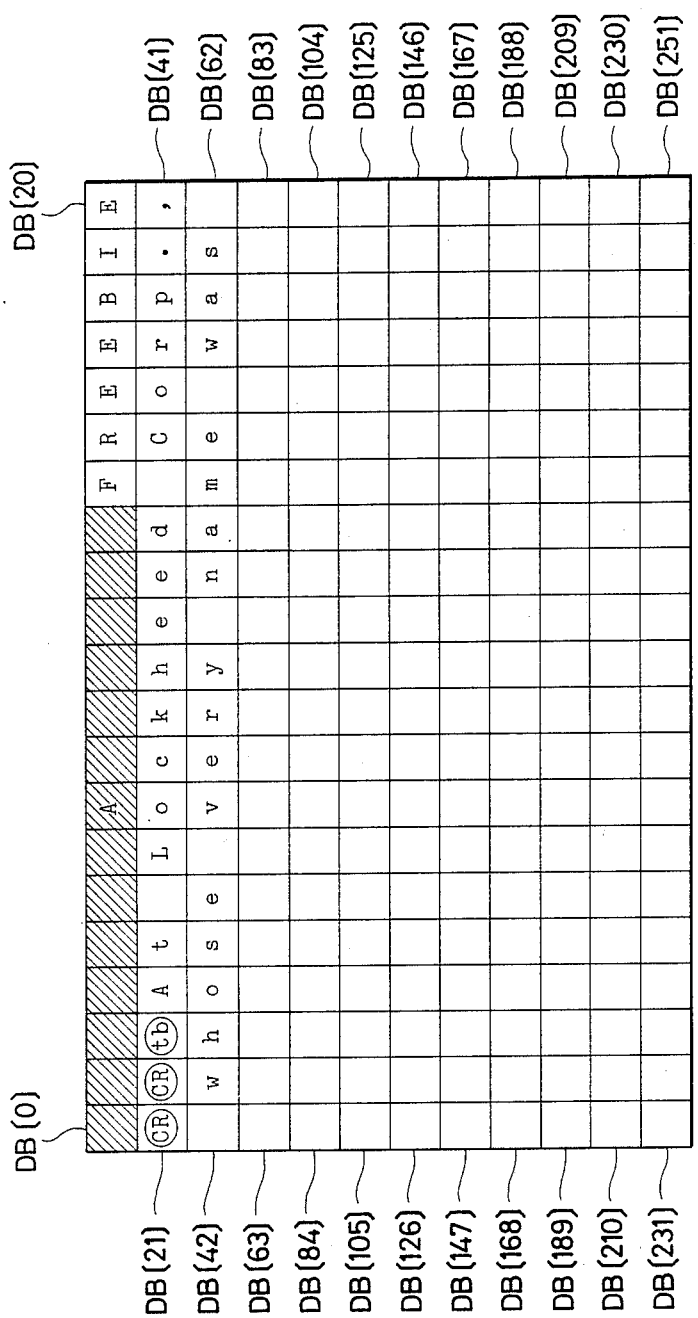

FIG. 20-2

| | (S7) | A | (S6) | F | R | E | E | B | I | E | (CR) | (CR) | (tb) | A | t | | L | o | c | k | h |
|---|---|---|---|---|---|---|---|---|---|---|---|---|---|---|---|---|---|---|---|---|---|
| | e | e | d | | C | r | o | p | . | , | | w | h | o | s | e | | v | e | r | y |
| | | n | a | m | e | w | | a | s | | | | | | | | | | | | |

FIG. 22

|  | CCR |
|---|---|
| CR - X | 27 |
| CR - Y | 0 |

| | |
|---|---|
| DSR - POSI | 22 |

|  | DSR-INF |
|---|---|
| INF - CR | 0 |
| INF - CN | 3 |
| INF - GH | 0 |
| INF - TB | 0 |
| INF - ID | 0 |
| INF - AW | 0 |
| INF - POSI | 4 |
| INF - CPOSI | 14 |

|  | DSR-FORM |
|---|---|
| FOM - LM | 0 |
| FOM - RM | 39 |
| FOM - ID | 0 |
| FOM - TB (0) | 4 |
| FOM - TB (1) | 9 |
| FOM - TB (2) | 14 |
| FOM - TB (3) | |
| FOM - TB (4) | |
| FOM - TB (n) | |

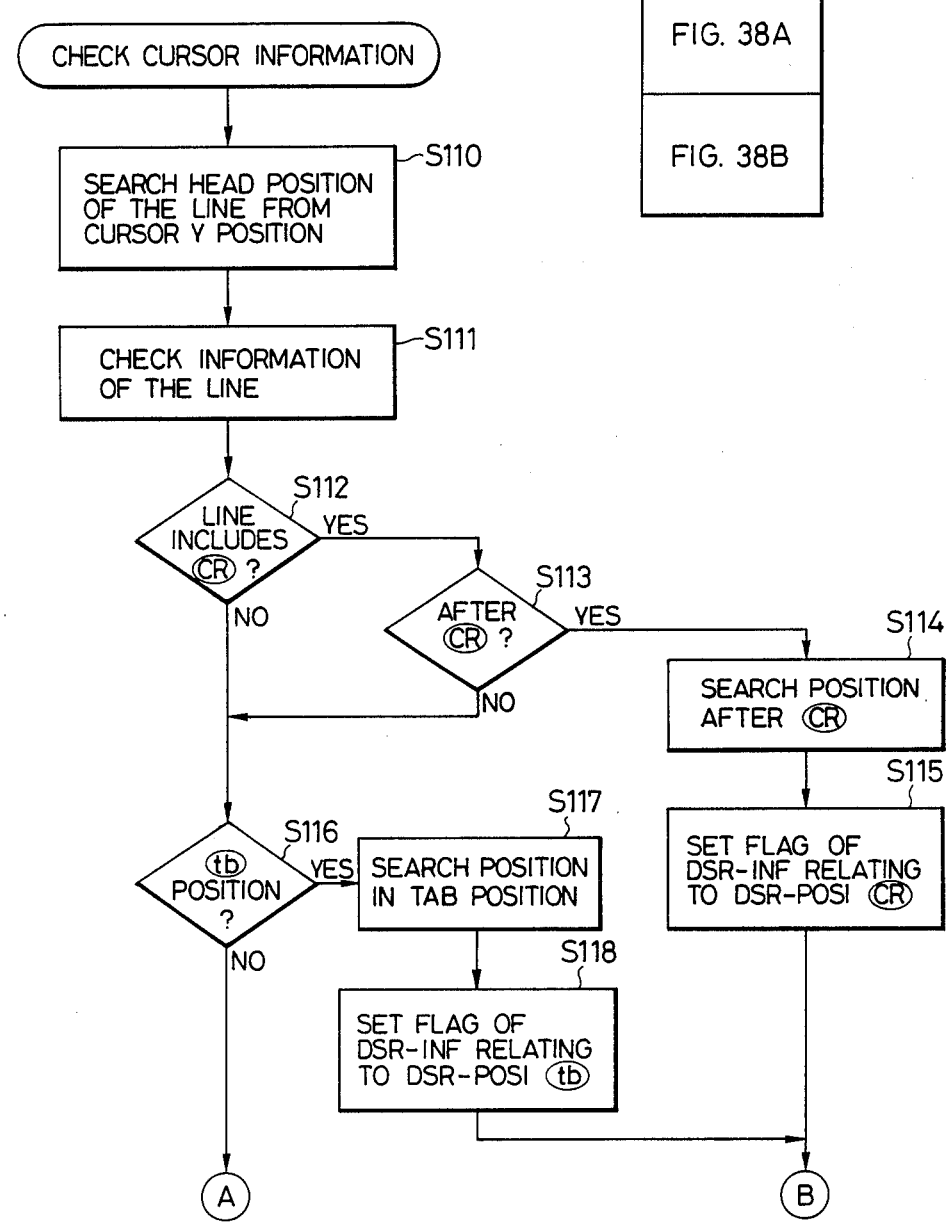

```
FML
       L . . t . . . . . t . . . t . . . . . . . . . . . . . . . . R
DL1
DL2      ▽
DL3        At Lockheed Corp., whose very name
DL4      was synonymous payoffs and freebies for
DL5      foreign officials in the 1970s, the
DL6      company now no longer picks up even
DL7      hotel bills for customers. ▽
DL8      ▽
DL9                                      △ TIME '81 March 6
DL10     ▽
DL11     ▽
DL12     ▽
```

△ FREEBIE ▽ (DL2 line)

| | CCR | |
|---|---|---|
| CR - X | 17 | |
| CR - Y | 8 | |

| DSR - POSI | 185 |
|---|---|

| | DSR-INF |
|---|---|
| INF - CR | 0 |
| INF - CN | 0 |
| INF - GH | 2 |
| INF - TB | 0 |
| INF - ID | 0 |
| INF - AW | 0 |
| INF - POSI | 6 |

| | DSR-FORM |
|---|---|
| FOM - LM | 0 |
| FOM - RM | 39 |
| FOM - ID | 0 |
| FOM - TB (0) | 4 |
| FOM - TB (1) | 9 |
| FOM - TB (2) | 14 |
| FOM - TB (3) | |
| FOM - TB (4) | |
| FOM - TB (n) | |
| TB - LEN | 0 |

FIG. 27

IMAGE PROCESSING APPARATUS WHEREIN CHARACTER STRING PROCESSING CAN BE PERFORMED ON A DISPLAY SCREEN

This application is a continuation of application Ser. No. 088,544, filed Aug. 20, 1987, now abandoned, which is a continuation of application Ser. No. 673,157, filed on Nov. 19, 1984, now abandoned.

BACKGROUND OF THE INVENTION

1. Field of the Invention

The present invention relates to an image processing apparatus in which the character processing works such as inputting, editing and the like of character string can be performed on a display screen.

2. Description of the Prior Art

Conventionally, character processing apparatus of the class described is generally equipped with a buffer memory for storing a display character string having memory areas each of which unconditionally corresponds to one display area on a display screen (or CRT) to the display character string, and a character at an arbitrary position on the CRT is stored in the buffer memory. In this way, since a buffer memory which corresponds to the CRT on a one-to-one-basis is used, for example, there is no need to input characters at and after a carriage return (CR). However, since it is necessary to display a blank on the CRT, a number of memory area portions are not used in the buffer memory. In addition, there is also a drawback such that a buffer memory having a large memory capacity is needed.

Therefore, a method has been proposed whereby the efficiency of the buffer memory is improved as the buffer memory having a continuous length is used as it is, without dividing the buffer memory into fixed lengths so that the buffer memory having a small memory capacity can be used. According to this method, the character string inputted is stored in the buffer memory as a continuous character string; thus, in the case where the above-mentioned CR is inputted a plurality of times, those plurality of CR codes may be memorized and all of the plurality of spaces may be merely stored. An amount of portions that are not used in the buffer memory becomes small and the buffer memory of a small capacity is enough.

That is, in the latter continuous use method, the space portion is replaced by a special code, thereby enabling the use efficiency of the buffer memory to be raised. However, in case of the latter method, with respect to a particular display function (e.g., tab or the like), it is necessary to also display the space portion which does not exist in the buffer memory. Consequently, in the latter continuous use method, it is impossible to easily perform the input and edit processings of new characters that could be easily performed at any positions on the CRT in the former buffer memory method of one-to-one correspondence. As described above, although the latter apparatus has been proposed to eliminate the drawback regarding the fixed length in the former conventional apparatus, this causes a new problem such that the input and edit processing works which can be easily carried out by the former apparatus cannot be easily executed by the latter apparatus.

SUMMARY OF THE INVENTION

In consideration of the above-mentioned points, it is an object of the present invention to eliminate the foregoing drawbacks.

In consideration of the above-mentioned points, it is an object of the invention to provide an apparatus for processing an image including characters in which a use efficiency is improved by a buffer memory having a relatively small memory capacity with only a small area that is not used and it is also possible to easily perform the input and edit processings of new characters at any positions on a CRT.

In consideration of the above-mentioned points, it is an object of the invention to provide an image processing apparatus comprising: storage means for continuously storing, as addresses, a carriage return code and character code string subsequent to this carriage return code which are inputted through character inputting means; display means for paragraphing the character string subsequent to the carriage return code and displaying them on the CRT; and input control means for making it possible to input characters in the line which is set by the carriage return code.

It is an object of the invention to provide an image processing apparatus comprising: character inputting means for inputting a predetermined tab code indicative of the setting of the tab and character codes; storage means for continuously storing, as addresses, the tab code and character code string subsequent to this tab code which are inputted through the character inputting means; display means for displaying the tab code as a space until the relevant tab set position on a CRT; and input control means for making it possible to input characters at the space position on the CRT corresponding to the tab code.

It is an object of the invention to provide an image processing apparatus comprising: character inputting means for inputting a predetermined centering code indicative of the setting of the centering and character codes; storage means for continuously storing, as addresses, the centering code and character code string subsequent to this centering code which are inputted through the character inputting means; display means for displaying on a CRT the character string sandwiched by a pair of those centering codes; and input control means for making it possible to input characters in the line of that character string of which the centering was set by those centering codes.

In consideration of the above-mentioned points, it is an object of the invention to provide an image processing apparatus comprising: character inputting means for inputting a predetermined gathering code indicative of the setting of the gathering and character codes; storage means for continuously storing, as addresses, the gathering code and character code string subsequent to this gathering code which are inputted through the character inputting means; display means for displaying on a CRT the character string surrounded by a pair of those gathering codes; and input control means for making it possible to input characters in the line of that character string of which the gathering was set by those gathering codes.

In consideration of the above-mentioned points, it is an object of the invention to provide an image processing apparatus in which, upon character input in a special code line, a space code of the amount corresponding to the content of the table information representing the deviation amount or the like between the CRT display position of a cursor indicative of the input position and the buffer memory position is converted or added with respect to the relevant special code, so that even in case of a character processing apparatus using special codes in which the one-to-one correspondence to the CRT is not realized, it is possible to input characters with similar easiness of handling as in a character processing apparatus having the buffer memory with the one-to-one correspondence to the CRT, and at the same time a high use efficiency of a memory medium is obtained without using a buffer memory having the one-to-one correspondence to the CRT.

BRIEF DESCRIPTION OF THE DRAWINGS

FIGS. 6, 8, 12, 17, and 24 are plan views each showing an example of a display state on a display screen of a display device CRT in FIG. 1 before characters are inputted;

FIG. 7 is an explanatory diagram showing the contents of the buffer memory DB in FIG. 1 corresponding to those display screens;

FIGS. 9, 13, 18, 22, and 25 are explanatory diagrams each showing the contents of the display registers in FIG. 1 corresponding to each of the above display screens;

FIGS. 10, 14, 19, 21, and 26 are explanatory diagrams each showing an example of the state on the display screen of the display device CRT in FIG. 1 after characters were inputted;

FIGS. 28 to 38, 38A and 38B are flow charts each showing an example of the operation of the apparatus of the invention in FIG. 1.

DETAILED DESCRIPTION OF THE PREFERRED EMBODIMENTS

The present invention will now be described in detail hereinbelow with reference to the drawings.

Figure 1:
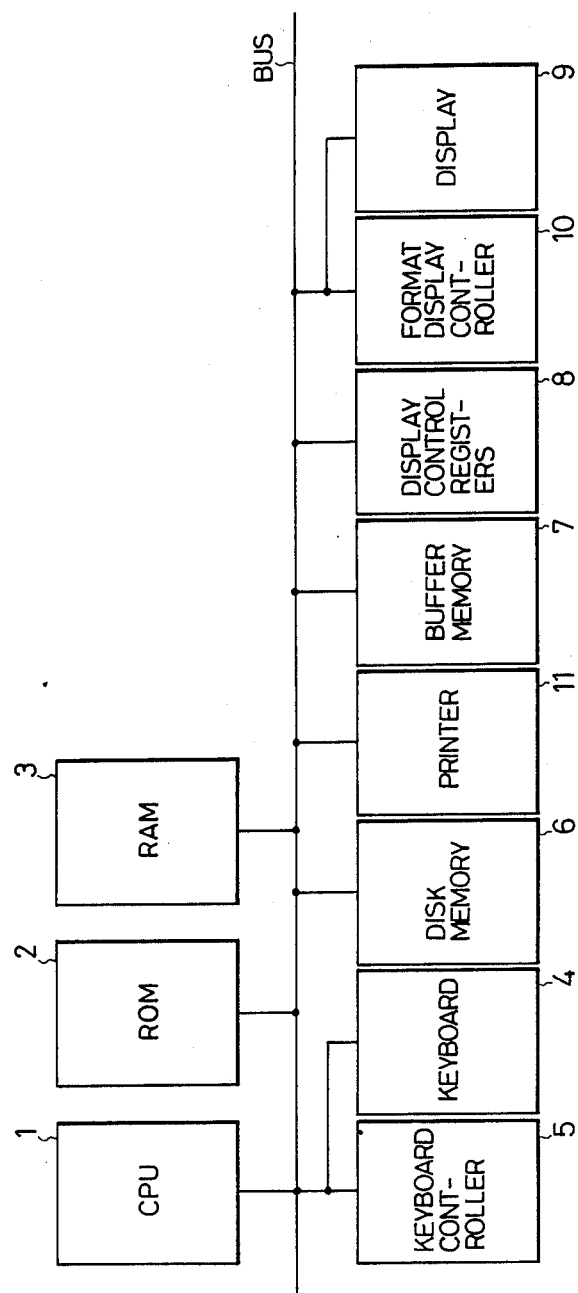
FIG. 1 is a block diagram showing an example of an arrangement of a character processing apparatus of the present invention.

FIG. 1 shows an example of an arrangement of an image processing apparatus for processing an image including character information according to the invention. In the diagram, CPU 1 denotes a microprocessor serving as a central processing unit. The CPU 1 performs the operation, logical discrimination and the like for the character processing and controls, through a bus BUS, each component element mentioned later which is connected to the bus. It is assumed hereinafter that an image includes character information. The bus BUS generally incorporates an address bus for transferring address signals, a control bus for transferring control signals and a data bus for transferring various kinds of data.

ROM 2 indicates a read only memory which is used as a control memory which has preliminarily stored various kinds of control procedures that are performed by the microprocessor CPU 1 with regard to various kinds of processings such as the character input, CRT display processing, edit processing, etc. which will be explained later. RAM 3 represents a writable random access memory which is used when the control procedure stored in the ROM 2 is executed. The RAM 3 is used as a work memory in the temporary storage of various data from each component element and in the operation and logical discrimination by the microprocessor CPU 1.

Figure 2:
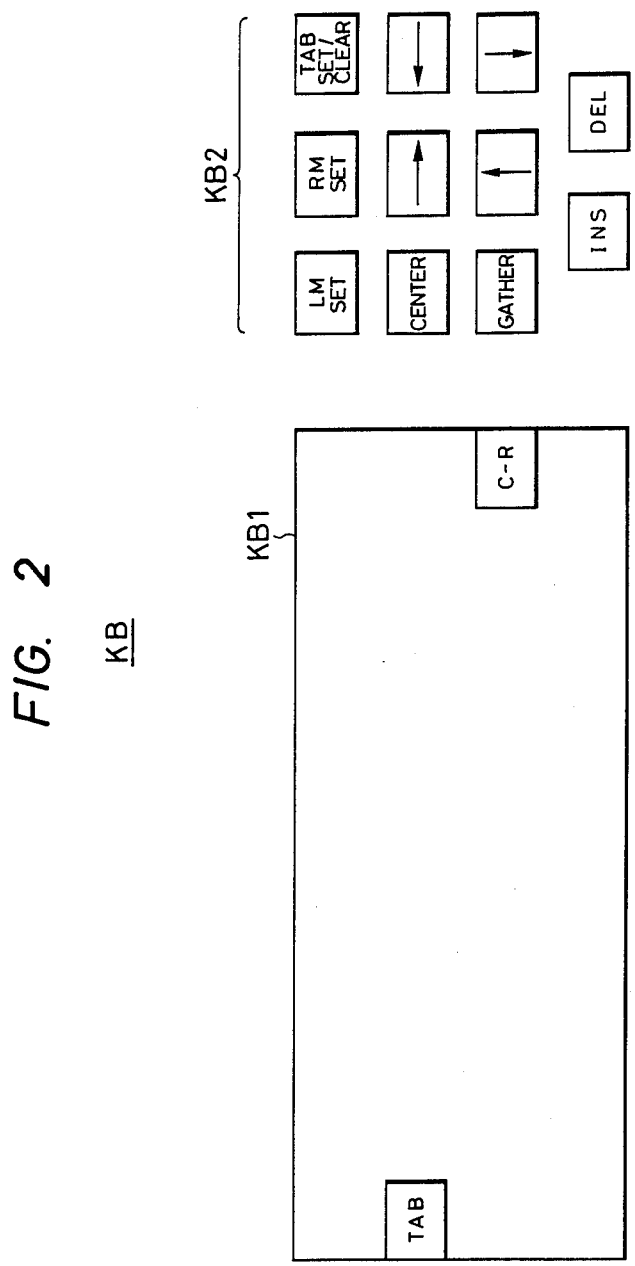
FIG. 2 is an arrangement diagram showing a detailed example of a keyboard KB in FIG. 1.

A reference numeral 4 denotes a keyboard (KB) for inputting characters. As shown in FIG. 2 described later, various keys for giving commands to the CPU 1 are arranged on the keyboard 4. A keyboard controller (KBC) 5 executes the key code conversion processing with respect to the input signal from the KB 4.

Figure 3:
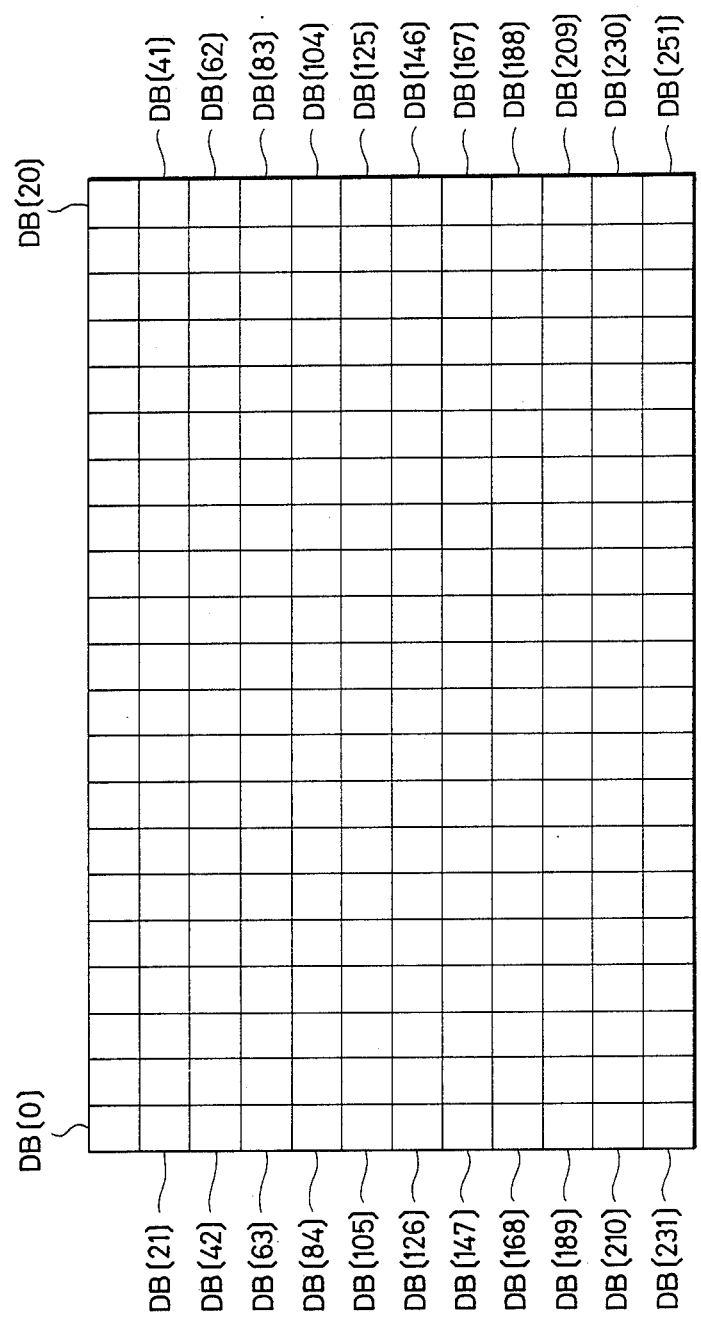
FIG. 3 is a diagram showing an example of a buffer memory DB in FIG. 1.
Figure 4:
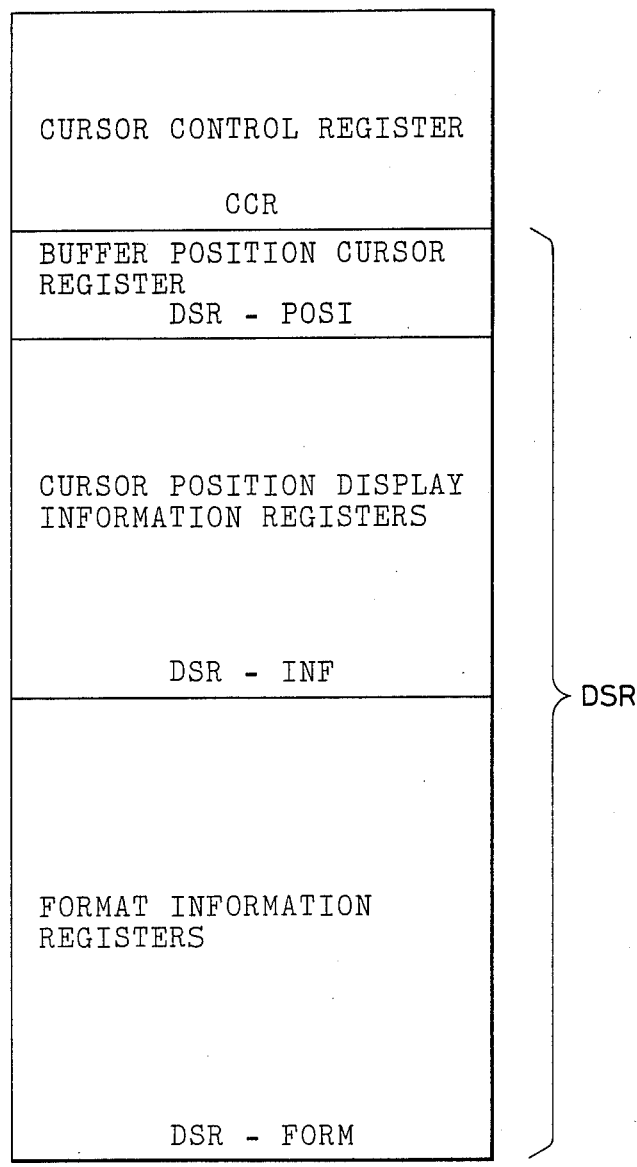
FIG. 4 is a schematic arrangement diagram showing an example of a display control registers DCR in FIG. 1.
Figure 5:
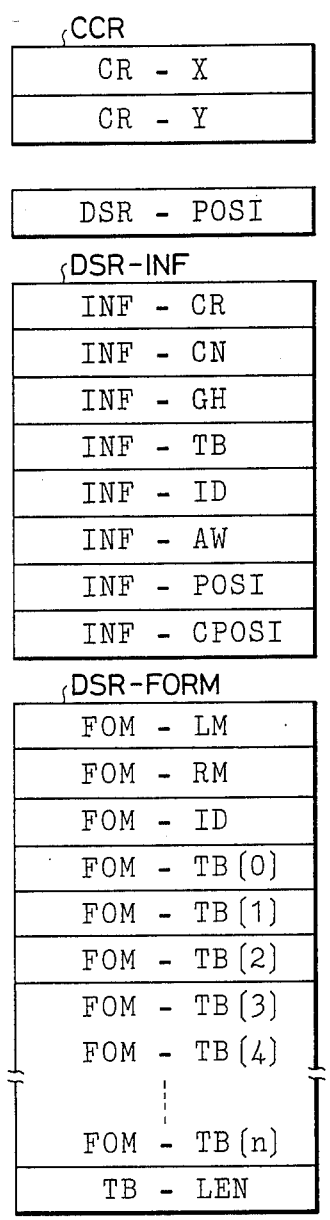
FIG. 5 is an arrangement diagram showing the details of the registers.

A disk memory (DISK) 6 is used for storage, access and the like of the sentences which were made and edited. A buffer memory (DB) 7 serves to make and edit sentences. A key code inputted through the KB 4 is stored as a character code. As shown in FIG. 3 mentioned later, the buffer memory (DB) 7 in this embodiment has as memory areas as many as 252 characters and those memory areas are dealt as the names of DB[0] to DB[251], respectively. A numeral 8 indicates display control registers (DCR) having a cursor control register (CCR), a buffer position cursor register (DSR-POSI), cursor position display information registers (DSR-INF), and format information registers (DSR-FORM) as shown in FIGS. 4 and 5 described later.

A numeral 9 denotes a display using a cathode ray tube (CRT), liquid crystal, light emitting diode, etc. This display 9 displays characters inputted through the KB 4 and data such as sentences and the like which were corrected and changed due to the edit processing. The display 9 simultaneously displays a character processing position which is designated by a cursor. A format display controller (DFC) 10 drives and controls the display 9. This DFC 10 performs the positioning control by the cursor on the display screen of the character string which the operator wants to display and the display control for converting display data to dot pattern data with reference to an internal character generator and thereby to display characters or symbols. A printer (PRT) 11 prints on a paper the sentences which were made and edited on the display screen.

FIG. 2 shows an example of an arrangement of the keyboard (KB) 4 in FIG. 1, in which KB1 denotes character keys (hereinbelow, referred to as normal keys) which are used to input normal characters, numerals, symbols, etc. The KB1 has a keyboard array based on, for instance, JIS standards and can input alphanumeric characters, kanas (Japanese syllabary) and the like through alphabet keys, kana keys and the like. The details regarding this KB1 are omitted. It is assumed that a carriage return key C-R is included in this key group KB1.

KB2 denotes function keys (hereinafter, referred to as special keys) which are used to instruct the execution of special processings such as movement of the cursor and the like. The KB2 has: a key LMSET to set the left margin; a key RMSET to set the right margin; a key TAB-SET/CLEAR to set and clear the tabulator; a key CENTER to give a command for execution of the centering of the cursor position; a key GATHER to give a command for execution of the gathering (right justification) of the cursor position; an inserting key INS to designate the insertion of characters; a deleting key DEL to designate the deletion of characters; and four cursor moving keys " ↑, ↓, ←, → " to instruct the movement of the cursor. The cursor moving keys indicated by " ↑, ↓, ←, → " are used to move the cursor by one character at a time to the top, bottom, left, and right, respectively.

In this embodiment it is assumed that sentences are made due to depression of the keys KB1 and KB2 and the sentences made have already existed in the buffer memory DB (7) for making and editing sentences. The functions of the above-mentioned respective keys that belong to the function keys KB2 are generally well known, therefore, their detailed descriptions are omitted.

FIG. 3 shows an example of an arrangement of the buffer memory DB (7) in FIG. 1. This buffer memory DB has memory areas of 252 characters as a memory for storing characters. A character code of one character can be stored in each memory area and the address numbers of [0] to [251] are allocated to the respective areas. In particular, DB[0] denotes the head position and DB[251] represents the last position and the continuous buffer memory is constituted.

FIG. 4 shows a schematic arrangement example of the display control registers DCR in FIG. 1 and FIG. 5 shows a further detailed arrangement example. As shown in FIG. 4, the display control registers DCR can be mainly classified into the cursor control register CCR and display registers DSR. Values of the cursor control register CCR represent x and y coordinates of the cursor on the display screen. As shown in FIG. 5, the x coordinate is indicated by an x register CR-X in which numeric values of "0" to "39" are stored and the y coordinate is represented by a y register CR-Y in which numeric values of "0" to "11" are stored.

As shown in FIG. 4, the display registers DSR comprise the buffer position cursor register DSR-POSI, cursor position display information registers DSR-INF, and format information registers DSR-FORM The buffer position cursor register DSR-POSI indicates the corresponding position in the buffer memory DB that corresponds to the cursor position in the display screen which is indicated by the above registers CR-X and CR-Y by the address number allocated to each memory area in the buffer memory DB.

The cursor position display registers DSR-INF indicate the deviation amount between the actual position of the cursor on the screen and the position in the buffer memory DB regarding that actual position. As shown in FIG. 5, the registers DSR-INF comprise: registers INF-CR to INF-AW to show the state of the cursor position on the display screen; and registers INF-POSI and INF-CPOSI to show the state of the cursor at a position where the cursor does not exist in the buffer memory. The register INF-POSI indicates the deviation amount between the actual cursor position and the cursor position in the buffer memory DB indicated by the register DSR-POSI, thereby showing the position of the cursor which does not actually exist in the buffer memory DB. The INF-CPOSI indicates the deviation amount between a centering code CN and the left margin. The contents of the above registers INF-CR to INF-TB are shown in the following table 1. In the table, the numeric value sections indicate flag values of the respective registers.

TABLE 1

| Registers DSR-INF | Numeric value | | | |
|---|---|---|---|---|
| | 0 | 1 | 2 | 3 |
| Register INF-CR (to show the positional relation between the carriage return and the cursor) | The cursor exists at a position on the left side of the carriage return or at the position of the carriage return. | The cursor exists at a position on the right side of the carriage return. | | |
| Register INF-CN (to show the positional relation between the centering and the cursor) | | The cursor exists between the centering characters. | The cursor exists at a position on the left side of the centering. | The cursor exists at a position on the right side of the centering. |
| Register INF-GH (to show the positional relation between the gathering and the cursor) | | The cursor exists between the gathering characters. | The cursor exists at a position on the left side of the gathering | |
| Register INF-TB (to show the positional relation between the tab and the cursor) | The cursor exists at another position than the tab position. | The cursor exists between the tab positions. | | |

The format information registers DSR-FORM are the registers into which the format information for display on the screen is set and, as shown in FIG. 5, they comprise: a register FOM-LM to set the character position of the left margin; a register FOM-RM to set the character position of the right margin; a register FOM-ID to set the character position of the indent; registers FOM-TB [0] to FOM-TB[n] (where, n is a positive integer) to store the tab positions designated; and a register TB-LEN to indicate the number of characters between a tab position and a character other than a space, the character existing between said tab position and its preceding tab position. In this embodiment, it is assumed that the registers FOM-LM, FOM-RM and FOM-ID are dealt in a manner such that the FOM-LM is "0", FOM-RM is "39" and FOM-ID is "0". In the registers FOM-TB [0] to FOM-TB [n] to indicate the tab positions, the tab positions as many as the number of tabs designated are sequentially set from the tab position having a small address.

Figure 6:
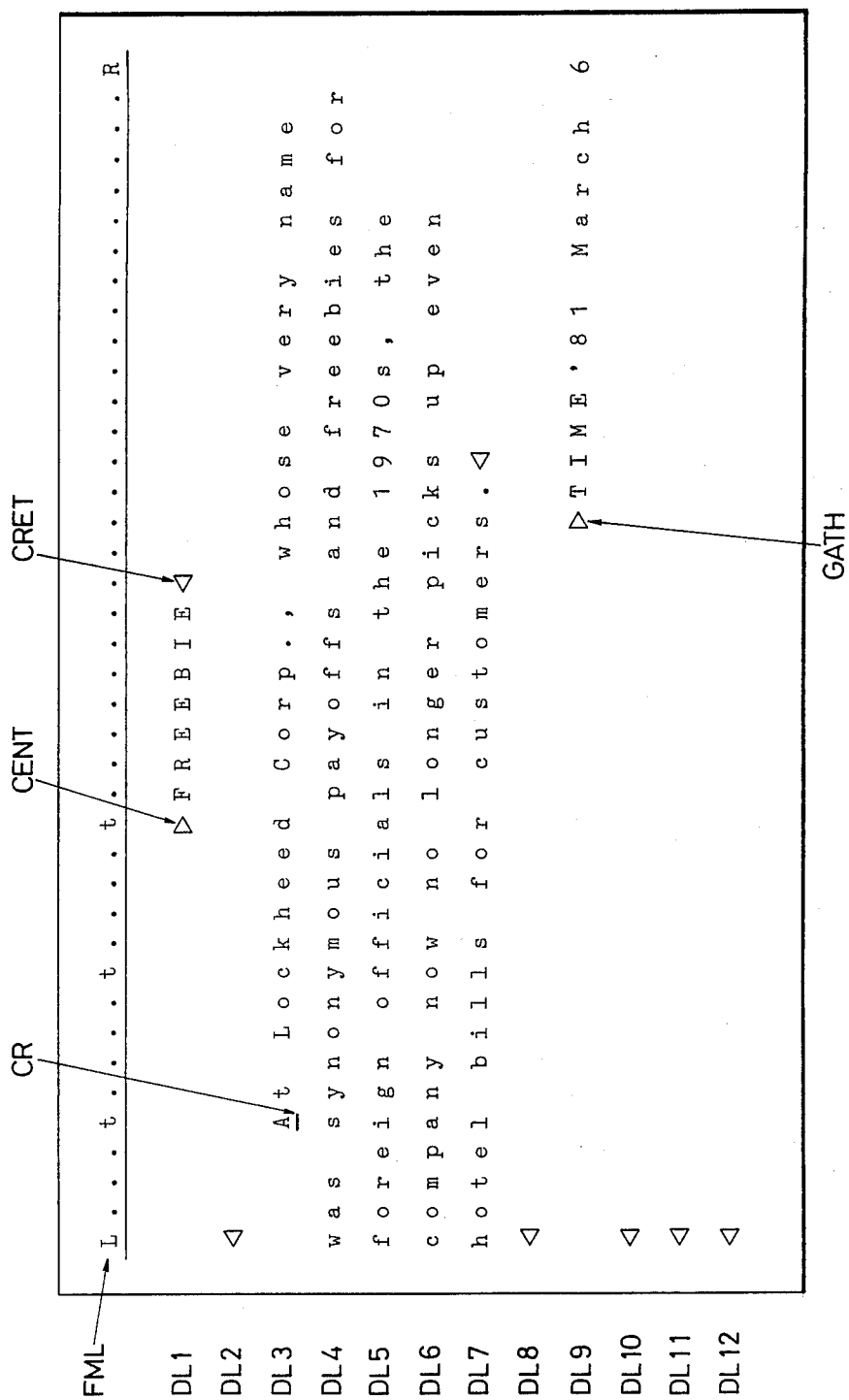

FIG. 6 shows an example of the state whereby the sentence inputted through the keyboard KB was displayed on the screen of the display CRT in FIG. 1. In this diagram, FML denotes a format line showing the format on the screen of the display CRT. A margin position and a tab position are displayed in this line. "L" displayed in the format line FML indicates the left margin position, "R" shows the right margin position, "t" represents the tab position, and "." indicates the positions at which characters are inputted. In this embodiment, it is assumed that the left margin is set to "0", the right margin is set to "39" and the tab is set to the three character positions (addresses) of "4", "9" and "14". Twelve lines indicated by DL1 to DL12 other than this format line FML are used as display areas for displaying sentences.

A cursor CR is displayed on the screen by a mark "_". The value of the register CR-X indicating the x coordinate of this cursor CR is "0" at the left margin position and "39" at the right margin position. On the other hand, the value of the register CR-Y showing the y coordinate of the cursor CR is "0" in the first line DL1 and "11" in the last line DL12. In this way, the cursor CR can be moved by the cursor moving keys within a range of the coordinates of (0, 0) to (39, 11). In addition, CENT denotes a centering position, CRET is a carriage return position and GATH is a gathering position.

Figure 7:
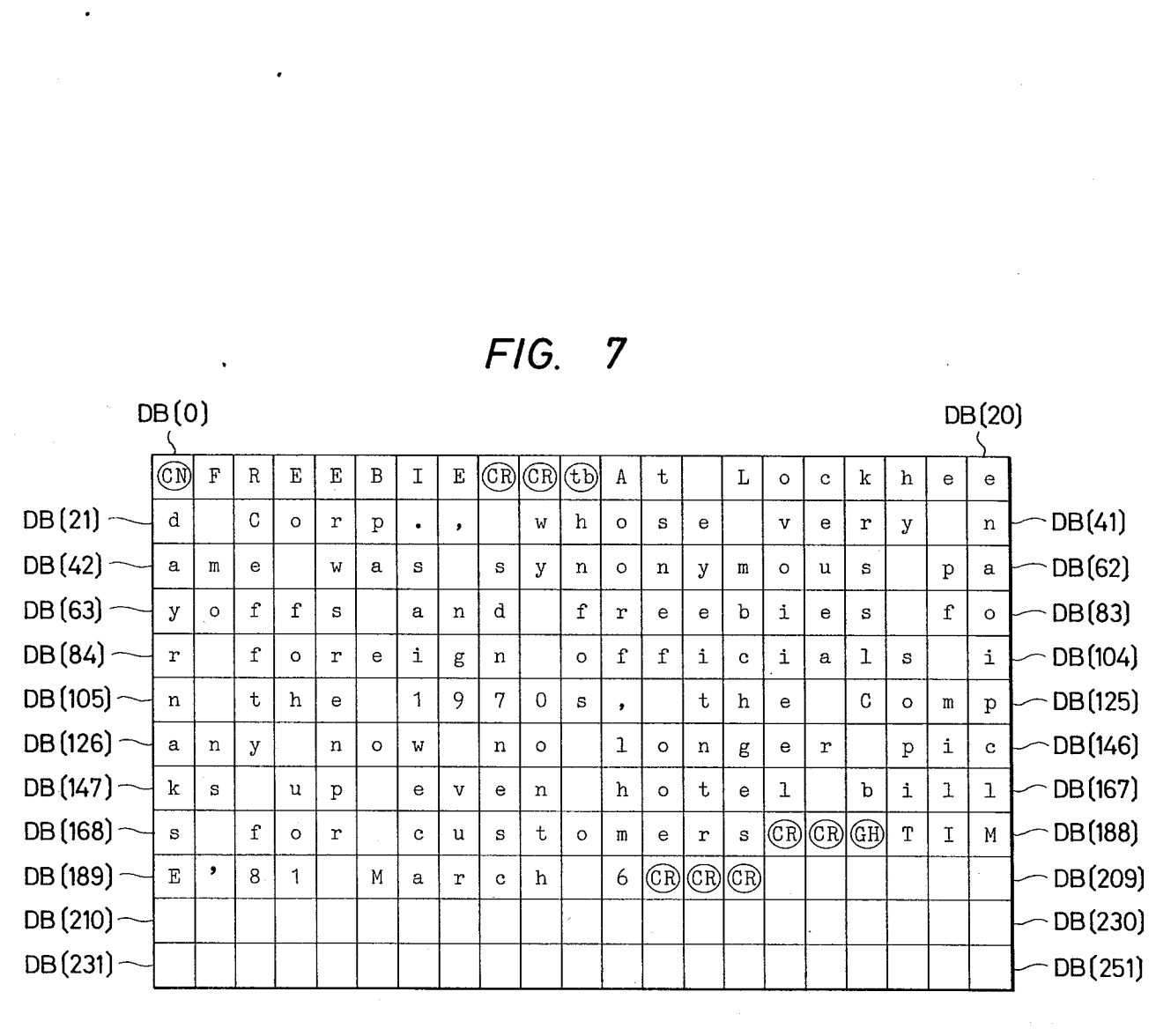

FIG. 7 shows an example of the storage state of the buffer memory DB in which the contents of the display screen shown in FIG. 6 were stored. As shown in the diagram, the character string to be displayed is continuously stored in the buffer memory DB and special codes (CN), (CR), (tb), and (GH) are included in the buffer memory DB. (CN) is a special code to indicate the start character of the centering. This code (CN) allows the character string in the section which is sandwiched between the special code (CN) and the special code (CR) to be displayed at the central position between the left and right margins.

(CR) is a special code to indicate the carriage return and the character string after this code (CR) is displayed from the next line.

(tb) is a special code to indicate the tab. This code (tb) allows the space characters (blanks) to be displayed on the screen until a preset backward tab position. It is now assumed that the number of space characters which are displayed due to the tab is set to the number of characters from the cursor position which is displayed at present to the tab position indicated by the tab position register FOM-TB [n]of the value that is closet to the above-mentioned current cursor position.

(GH) is a special code to indicate the head of the character string which is subjected to the gathering. This code (GH) permits the character code in the section which is sandwiched between the special code (GH) and the special code (CR) to be displayed on the screen so as to coincide with the right margin In this embodiment, the "gathering" means that the character string sandwiched between the codes (GH) and (CR) is displayed or printed in such a manner that the character which is one character before the code (CR) is set at the position of the right margin. When the buffer memory (DB) having the contents shown in FIG. 7 is displayed on the display CRT, it will be as shown in FIG. 6 or 8.

Figure 8:
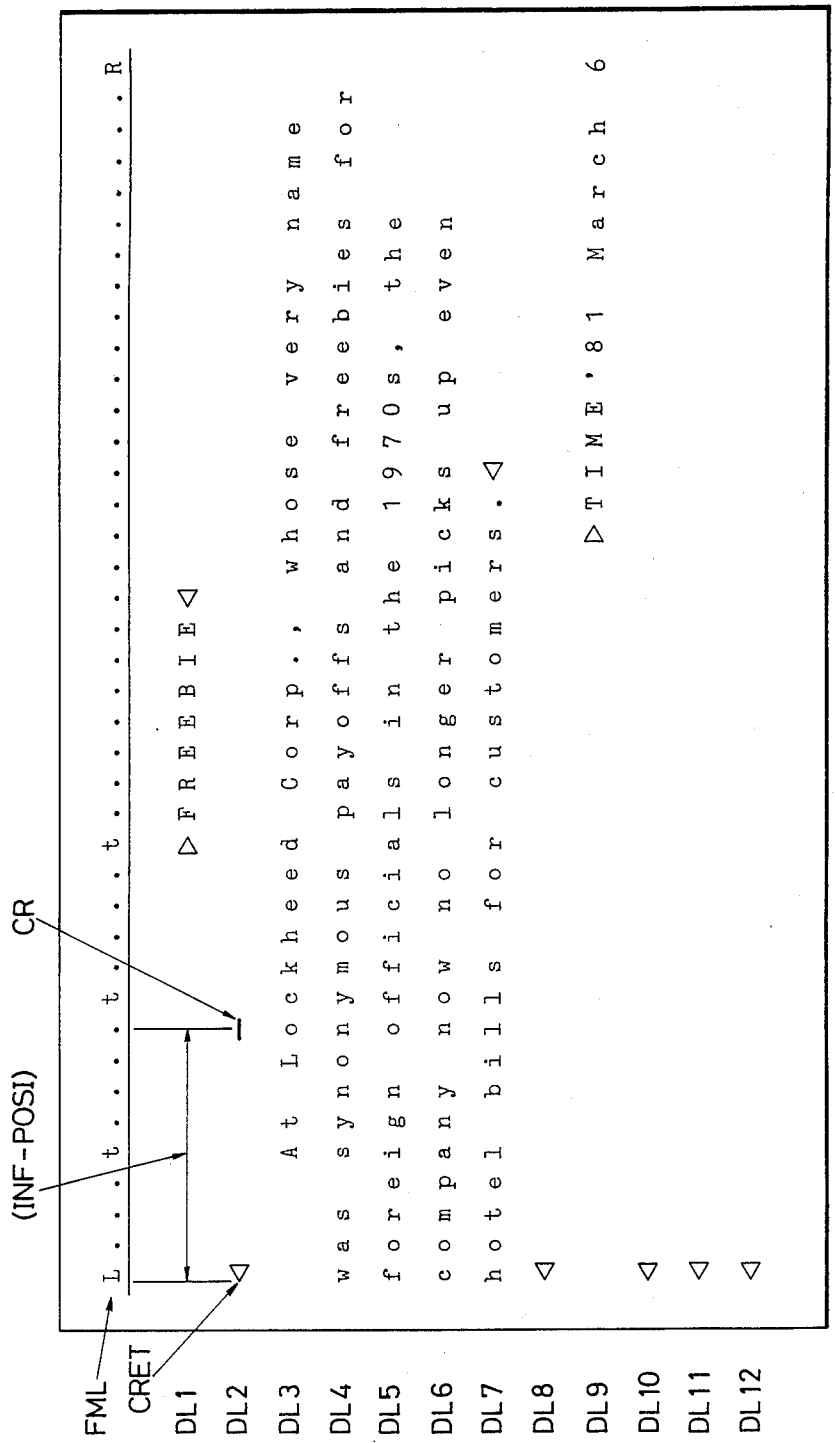
Figure 10:
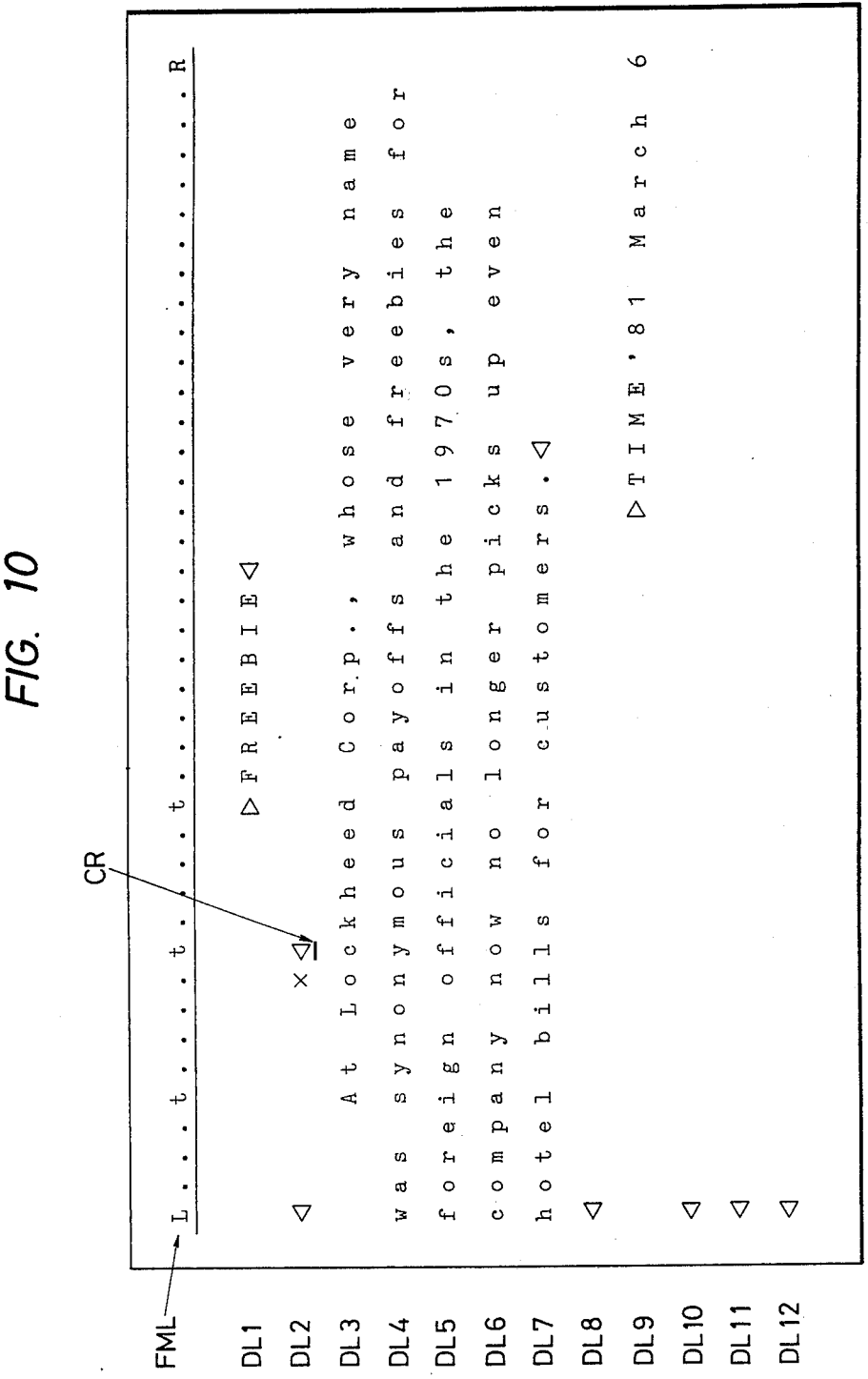
Figure 11:
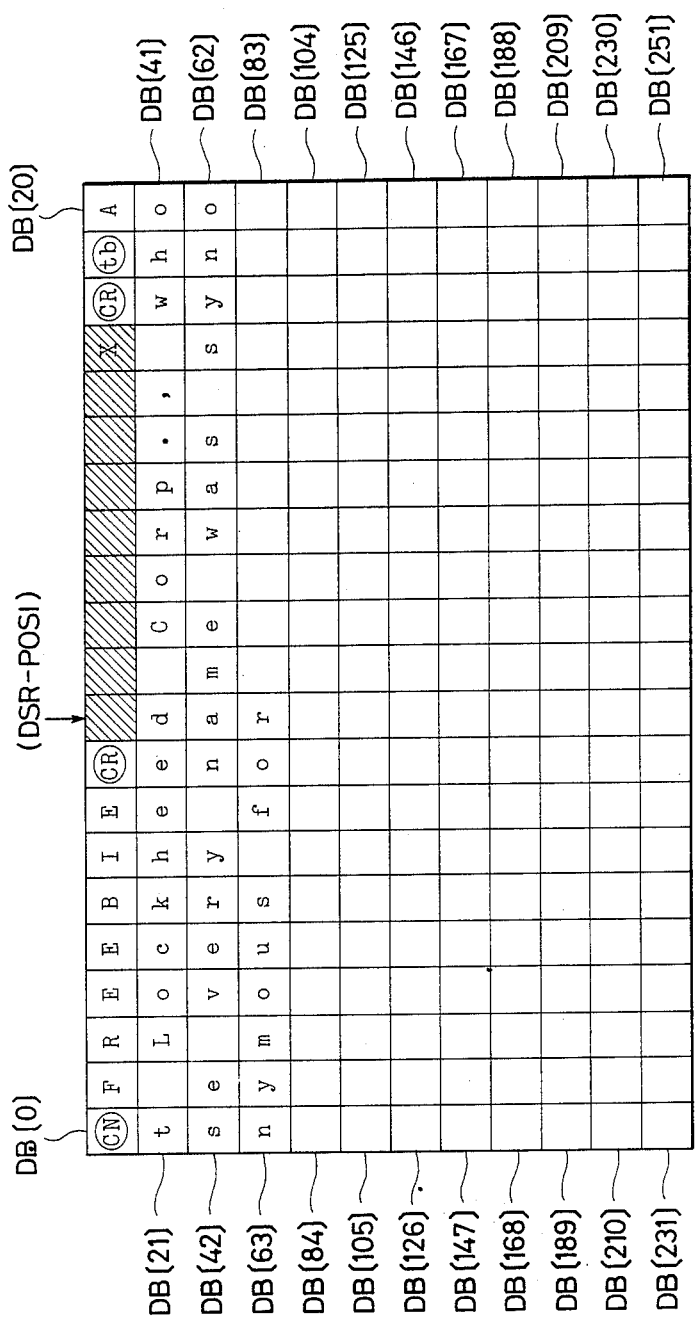
FIGS. 11, 15, 16; 20-1, 20-2, 23, and 27 are explanatory diagrams each showing the contents of the buffer memory DB in FIG. 1 after characters were inputted.

FIG. 8 shows an example of the state of the display screen of the display CRT in the case where the cursor CR is located at a position on the right side of the carriage return position (position of CRET in FIG. 8). FIG. 9 shows the contents of the respective registers of the display control registers DCR at this time. FIG. 10 shows the state of the display screen when the characters were inputted at the position of the cursor CR in FIG. 8. FIG. 11 shows the state of the buffer memory DB at this time. Namely, in the buffer memory DB, the code of the input character "x" at this time is inserted between the special codes (CR) and (CR) together with eight space codes, and the information behind "x" is sequentially moved backward (refer to FIG. 11).

Figure 12:
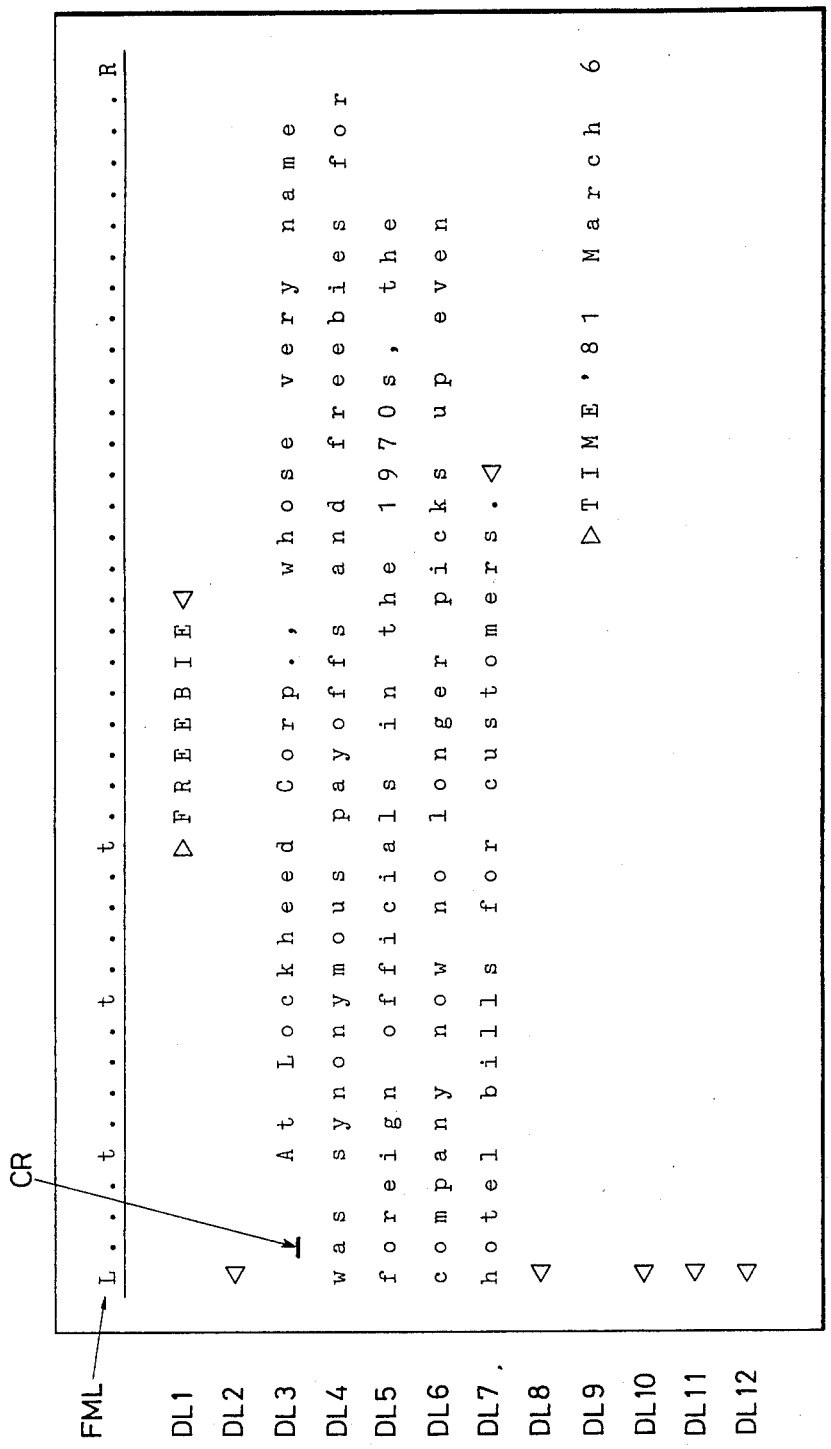
Figure 14:
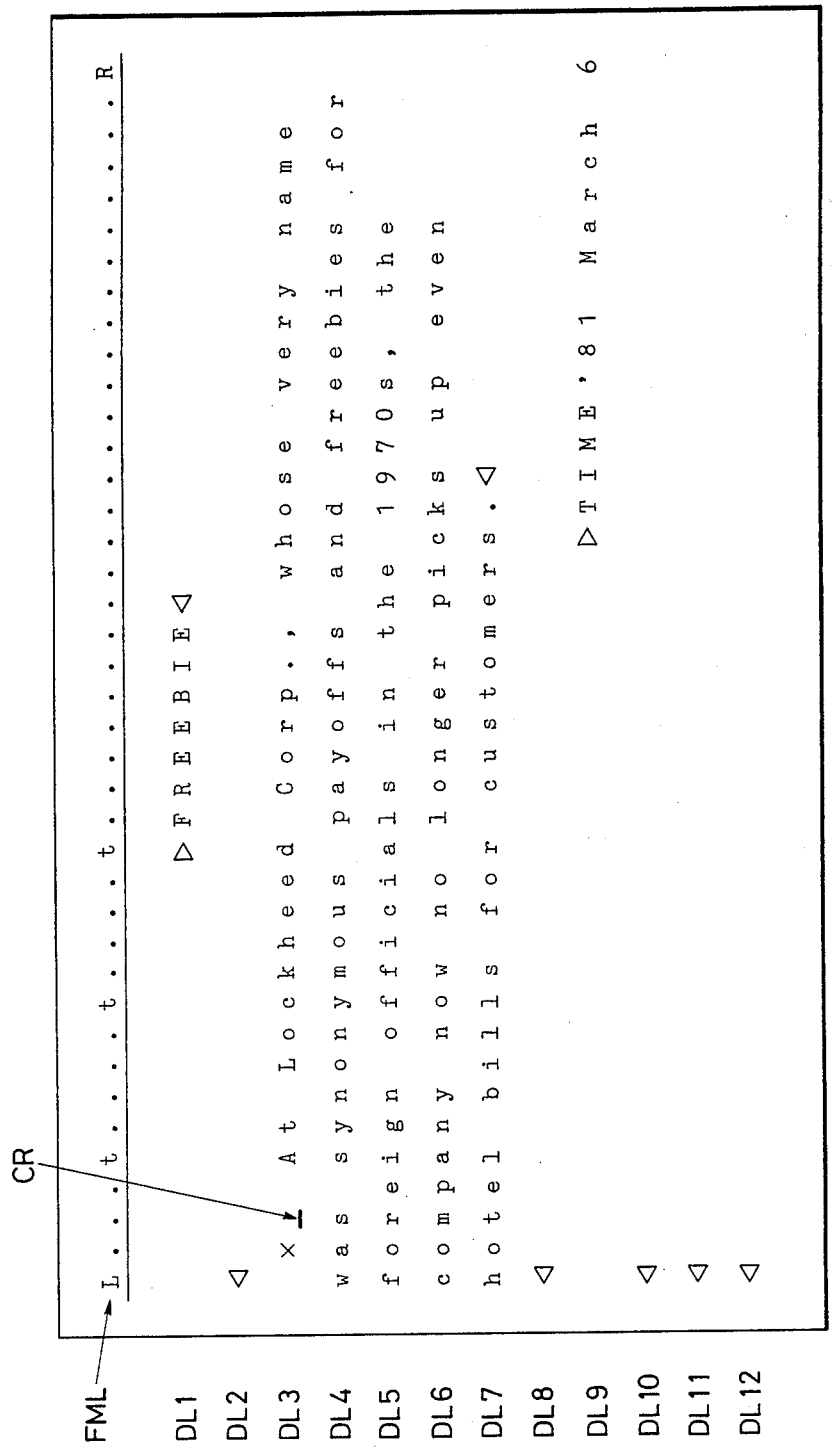
Figure 15:
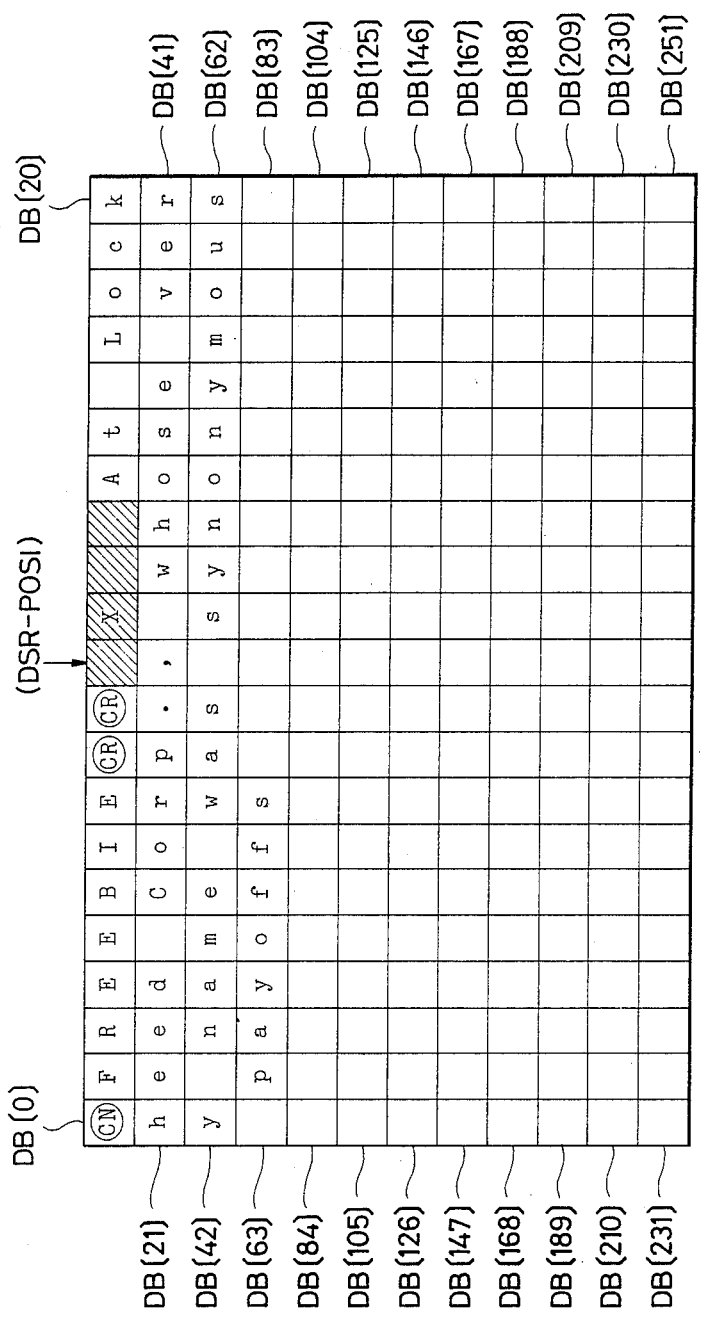
Figure 16:
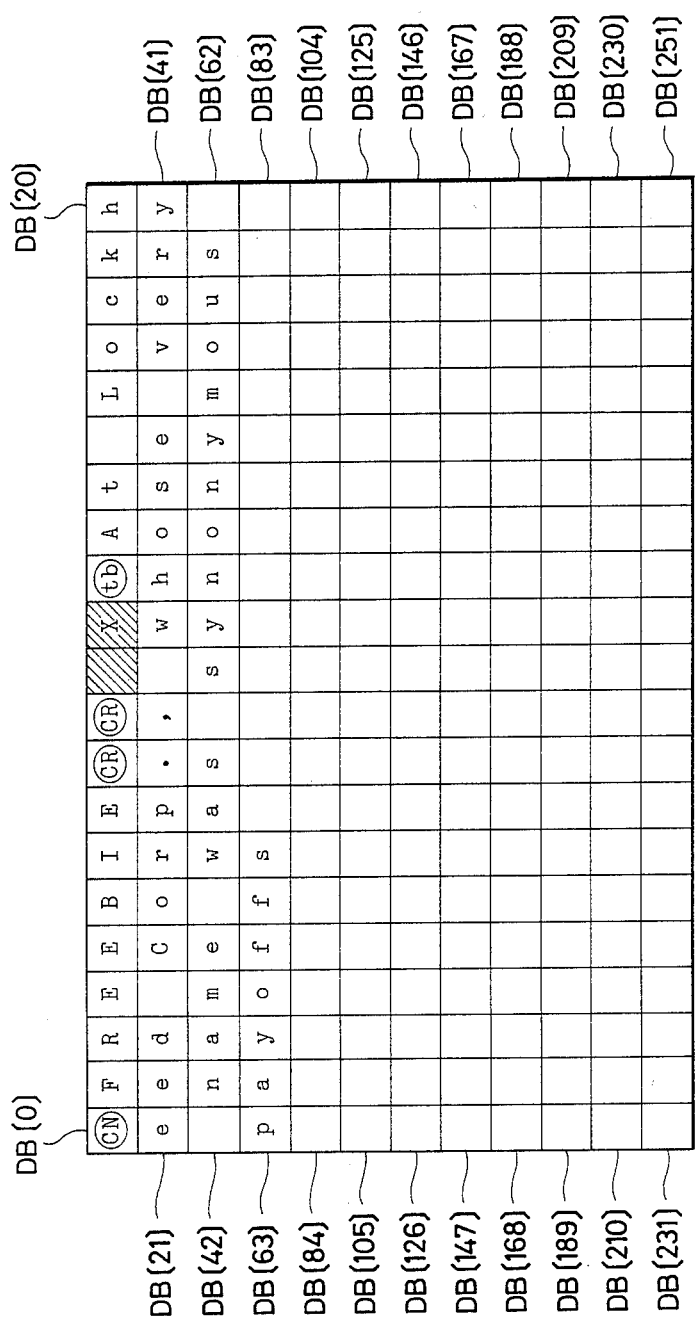

FIG. 12 shows an example of the state of the display screen when the cursor CR is located at the tab position (position indicated by (tb) before "At" shown in FIG. 6). FIG. 13 shows the contents of the respective registers of the display control registers DCR at this time. FIG. 14 shows the state of the display screen when the characters were inputted at the position of the cursor CR in FIG. 12. FIGS. 15 and 16 show the states of the buffer memory DB at this time. That is, in the buffer memory DB, the code of the input character "X" at this time may be replaced by the special code (tb) together with the space codes or may be inserted between the codes (CR) and (tb) (refer to FIG. 16).

Figure 17:
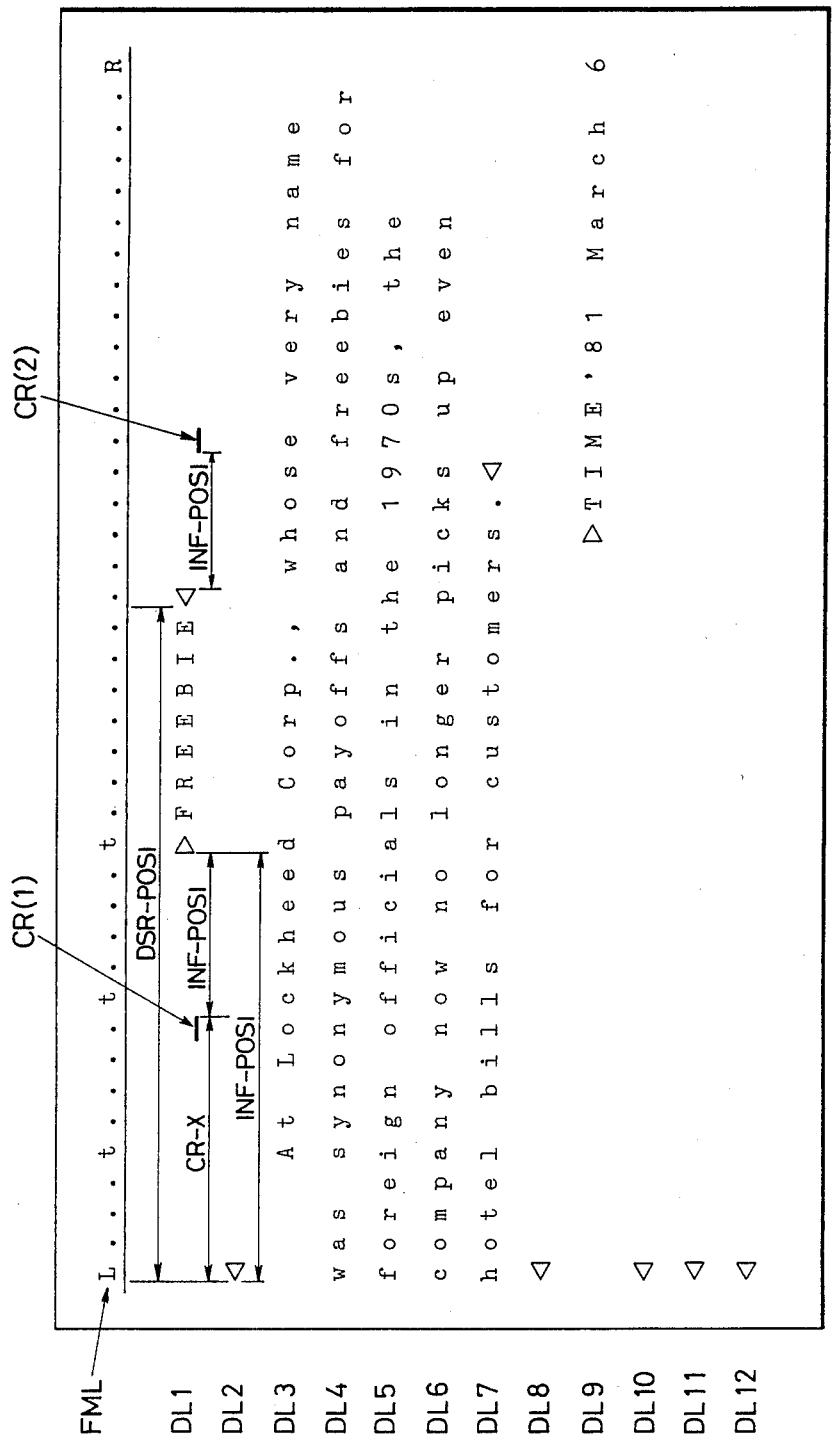

FIG. 17 shows an example of the state of the display screen when the cursor CR is located at a position on the left or right side of the centering. FIG. 18 shows the contents of the respective registers of the display control registers DCR when the cursor is located at a position on the left side of the centering. FIG. 19 shows the state of the display screen when the characters were inputted when the cursor exists at a location on the left side of the centering. FIG. 20-1 shows the state of the buffer memory DB at this time.

Figure 21:
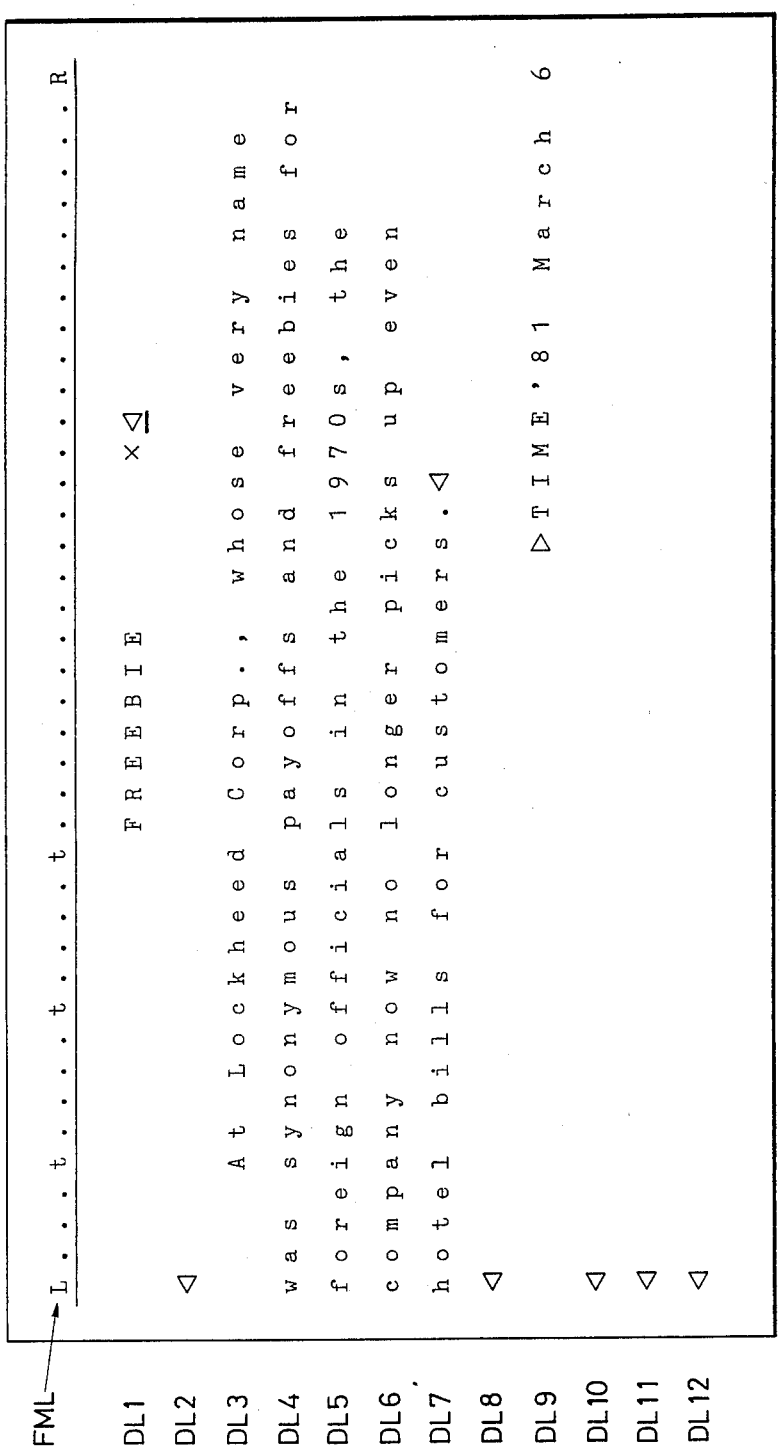
Figure 23:
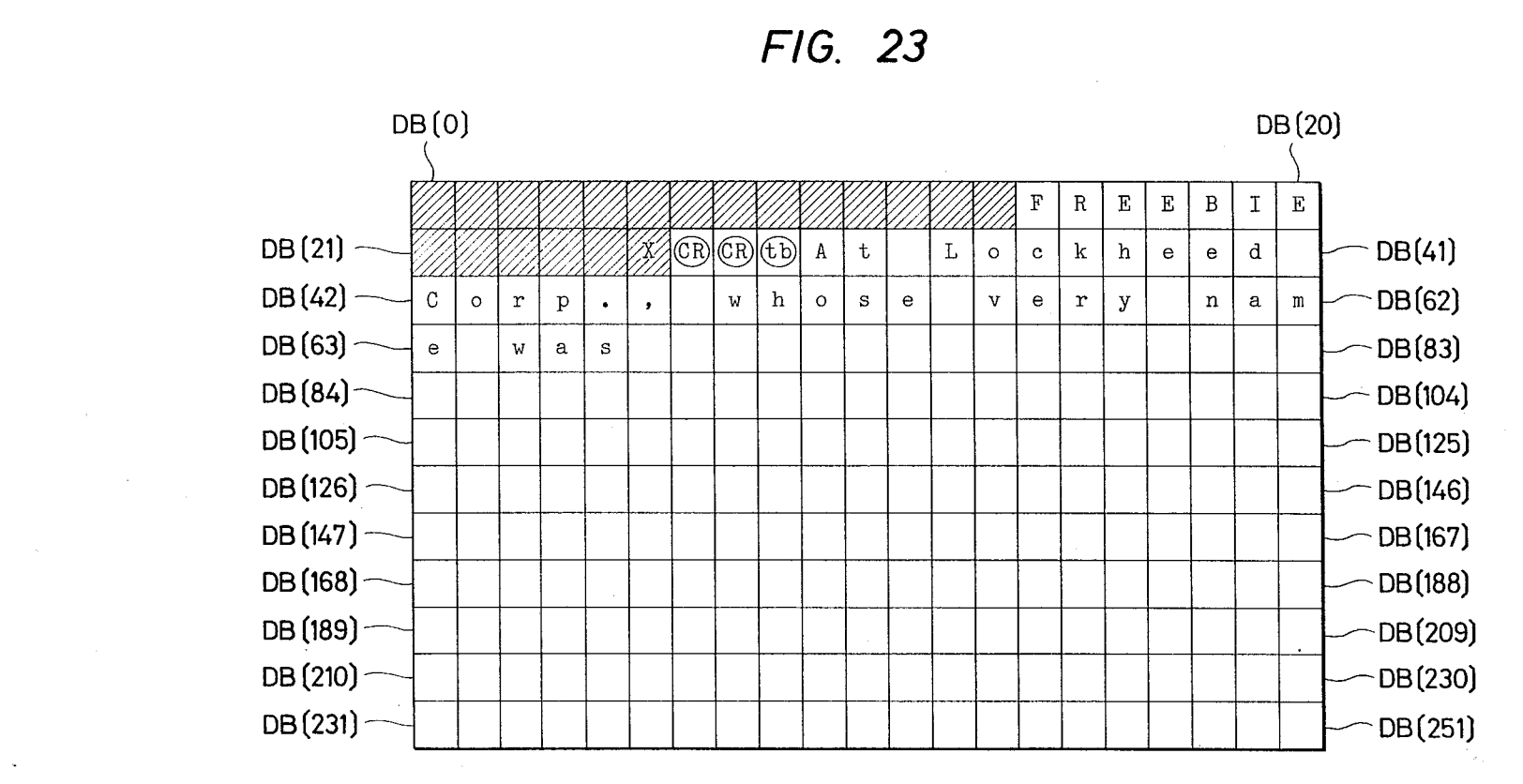

FIG. 21 shows the state of the display screen when the characters were inputted when the cursor exists at a position on the right side of the centering. FIG. 22 shows the contents of the respective registers of the display control registers DCR prior to the execution of this processing. FIG. 23 shows the state of the buffer memory DB corresponding to FIG. 21. Namely, in the buffer memory DB, the code of the input character "X" at this time is inserted before the special code (CR) together with five space codes, and at the same time the special code (CN) is replaced by fourteen space codes (refer to FIG. 23).

Figure 26:
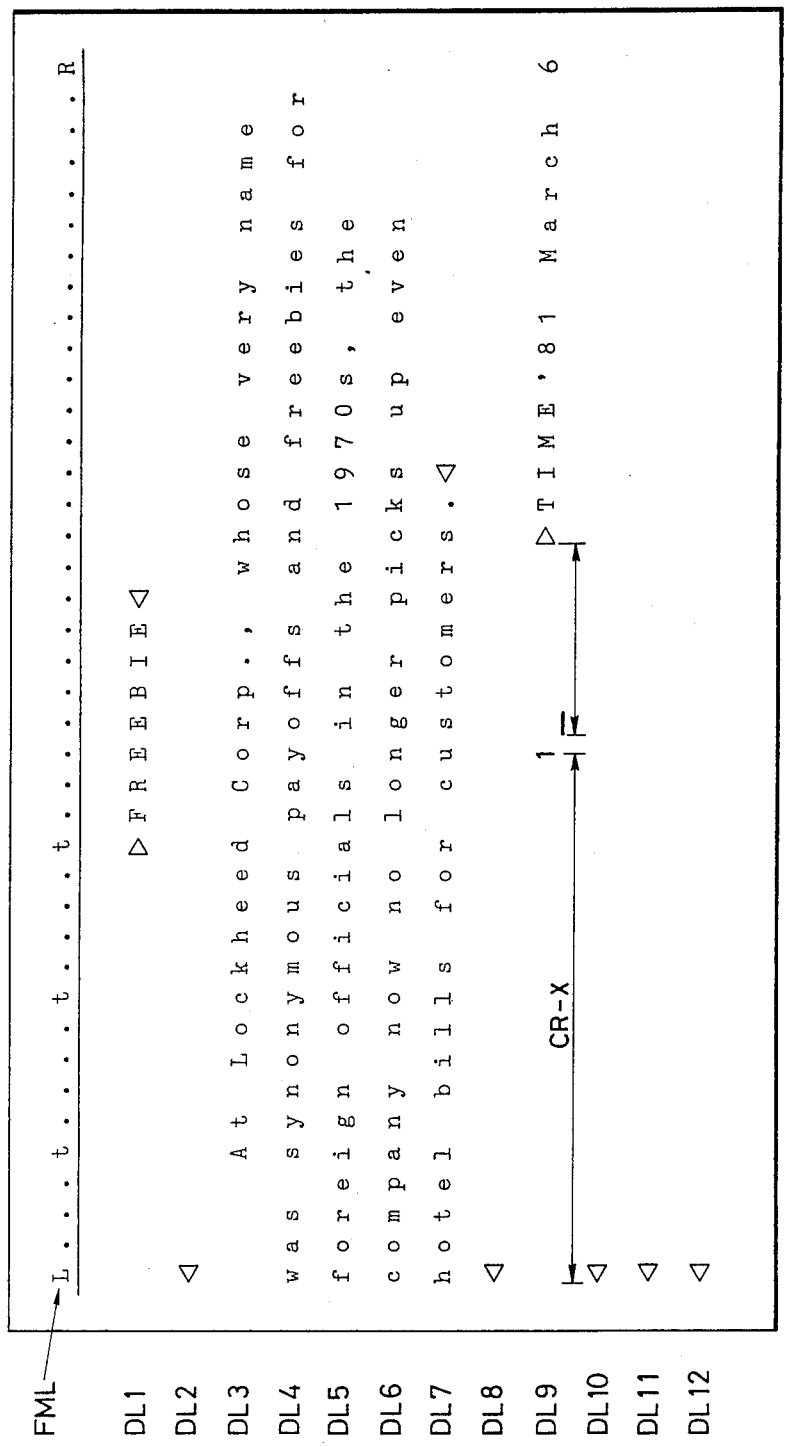
Figure 27:
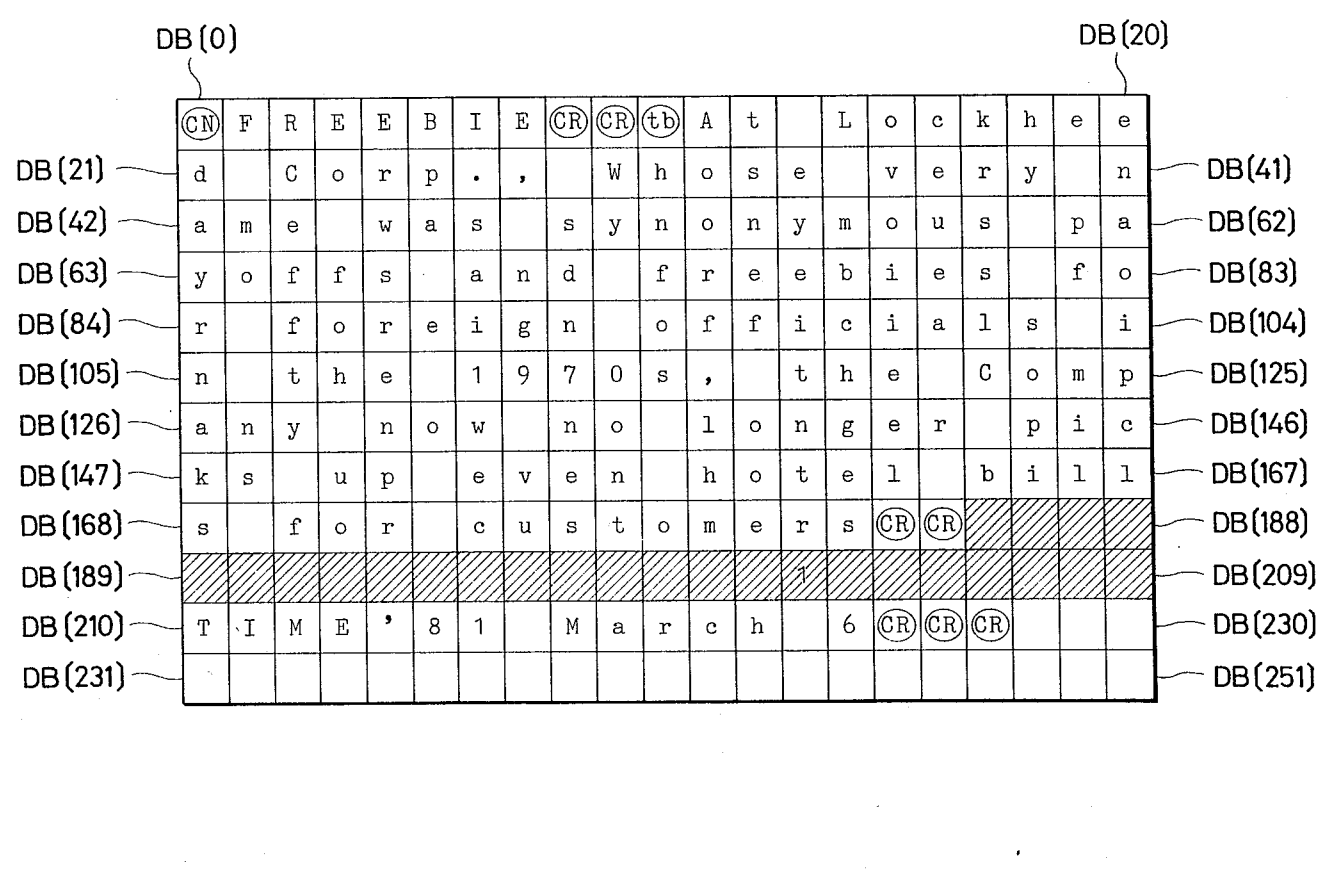

FIG. 24 shows an example of the state of the display screen when the cursor CR exists at a position on the left side of the gathering. FIG. 25 shows the contents of the respective registers of the display control registers DCR at this time. FIG. 26 shows the state of the display screen when the characters were inputted when the cursor exists at a position on the left side of the gathering. FIG. 27 shows the state of the buffer memory DB at this time. That is, in the buffer memory DB, the code of the input character "A" at this time is replaced by the special code (CN) together with thirteen space codes (refer to FIG. 27).

On the other hand, there will be explained an embodiment whereby a use efficiency of the buffer memory can be improved as much as possible even in the case where, in addition to the above-mentioned cases, characters were inputted and the special codes such as (tb), (CN), etc. are replaced by a plurality of spaces and input characters and also in the case where, when those characters were inputted, those plurality of spaces are expressed by one code and characters are inputted. Practically speaking, as shown in FIG. 20-2, when special codes S7 and S6 are set, six or seven spaces are respectively expressed by one special code, so that the use areas in the buffer memory can be remarkably reduced as compared with FIG. 20-1. Also, the character input at the position of the special code can be performed in a similar manner as the processing of the tab code (tb). In this case also, the use of a special code regarding spaces enables the use area in the buffer memory to be remarkably reduced.

Next, an example of the operation of the apparatus of the present invention shown in FIG. 1 will be described with reference to flow charts in FIGS. 28 to 38.

Figure 28:
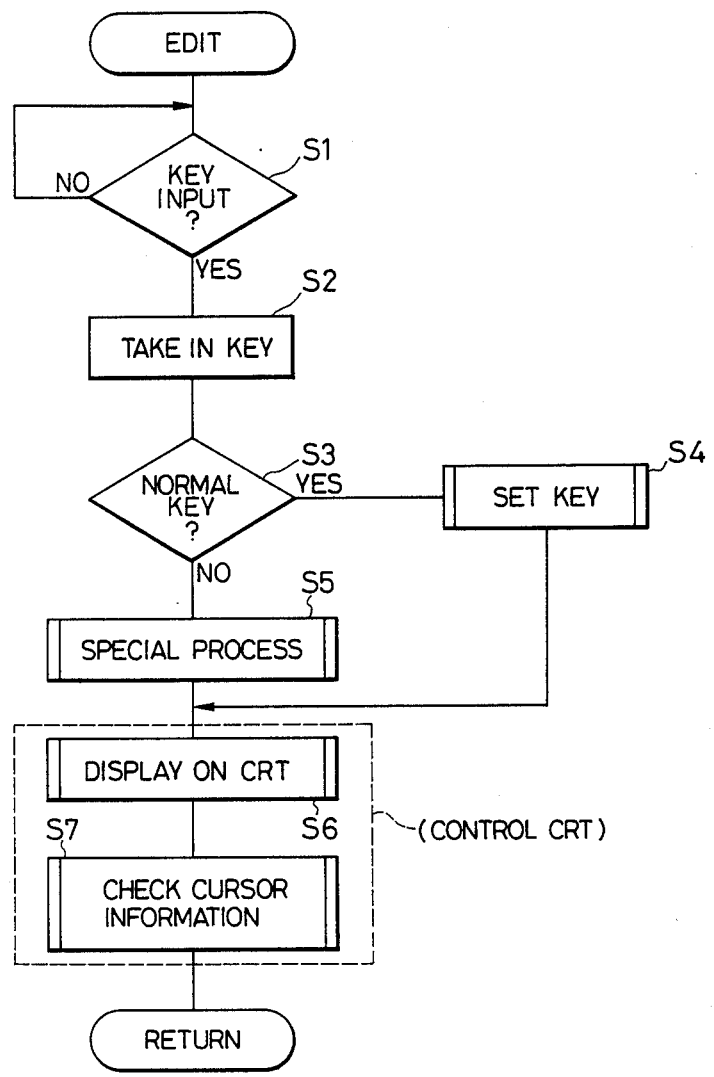

FIG. 28 shows the overall processing procedure when one key of the keyboard KB was depressed. By repeatedly executing this processing procedure, the character processing such as the making, editing or the like of sentences is performed.

First, in step S1, the apparatus waits for the input of a key through the keyboard 4. When it is determined that a certain key was depressed, the processing to take in the key is executed in the next step S2. In this take-in processing, the key code corresponding to the depressed key is fetched and this key code is checked in step S3 to see if it belongs to normal keys KB1 or not.

When it is determined that the key code corresponds to a normal key in the normal keys KB1, the key set process in step S4 in FIG. 28 which will be explained in detail in conjunction with FIGS. 29 to 36 mentioned later, is executed In this key set process, the key code is set into the buffer memory DB in accordance with the state of the cursor position set on the display screen.

On the other hand, where the key code corresponds to one of the special keys KB2 other than the normal keys KB1, the process routine advances from step S3 to S5 in FIG. 28 and the special process corresponding to that key code is carried out. For instance, when the inputted special key is the centering execution key CENTER or gathering execution key GATHER, the centering start code (CN) and the code (CR) indicative of the end of centering are set into the buffer memory DB, or the gathering start code (GH) and the code (CR) indicative of the end of gathering are set. However, in this embodiment, this process relates to the edit processing after those special codes (CN), (CR) and the like have already been set into the buffer memory DB; therefore, the detailed description regarding the setting procedure of those special codes into the buffer memory DB is omitted.

After the contents of the buffer memory DB were changed or the like due to the foregoing key set process or special process, the contents of the buffer memory DB are displayed on the display CRT due to the CRT display process in next step S6, then the cursor information check process is performed in step S7. Thus, the process regarding the depression of one key ends. The process routine then returns to step S1 and the apparatus waits for the input of the next key.

Next, the above-mentioned key set process in step S4 in the case where a normal key was inputted will be described in detail with reference to the flow charts in FIGS. 29 to 36.

Figure 29:
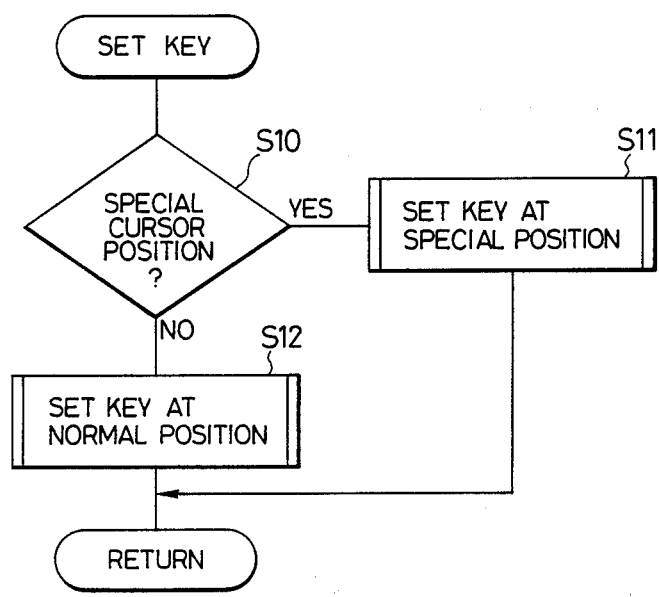

FIG. 29 shows the whole key set process. In this process, first, in step S10, a check is made to see if the position of the cursor CR on the display screen when the key set process was designated is located at a special position described later or not. The position of the cursor CR on the display screen is determined by referring to flag values (numeric values) which were set into the respective registers of the cursor position display information registers (hereinbelow, called a cursor position information table) DSR-INF. This cursor position information table is updated due to the CRT control process for performing the cursor moving process in step S7 mentioned above and the cursor position information is always correctly set in response to the cursor moving process, so that the cursor position on the screen can be accurately determined.

Figure 30:
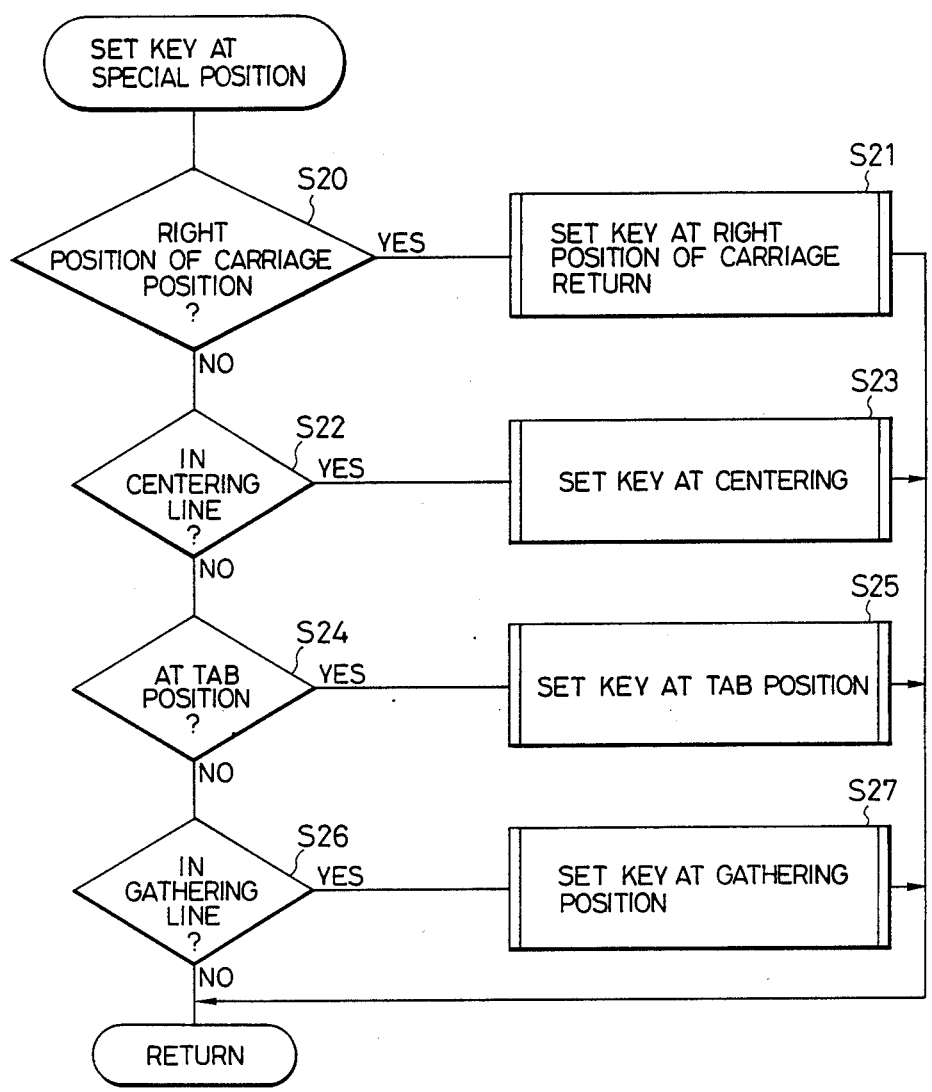

When it is determined that the cursor exists at a special position, the key set process at the special position is executed in step S11, and thereafter the process routine returns to the main routine in FIG. 28. In the case where the cursor is located at another normal position than the special position, the key set process at the normal position is executed in step S12, then the process routine returns to the main routine in FIG. 28. In the key set process at this normal position, the character code of the input character is set at the cursor position in the current buffer memory DB which is indicated by the buffer position cursor register (hereinafter, called a buffer cursor) DSR-POSI FIG. 30 shows the overall key set process at the special position in step S11 mentioned above. The special position means the position on the right side of the carriage return, position in the centering line, tab position, and position in the gathering line. The information at this special position has been respectively set into: the corresponding carriage position information register INF-CR in the cursor position information table DSR-INF; the centering position information register INF-CN; the tab position information register INF-TB; and the gathering position information register INF-GH. Therefore, by sequentially referring to the flag values of those respective registers (see Table 1 mentioned before), the current cursor position information can be known. Further, since the cursor is not simultaneously set at two special positions, the key set process that should be executed next is unconditionally determined.

Consequently, first in step S20, a check is made to see if the cursor is located at a position on the right side of the carriage return or not by use of the flag in the carriage position information register INF-CR. If the answer is "YES" in step S20, the key set process at a right position of the carriage return is executed in step S12, then the process will return to the main routine. If "NO" in step S20, a check is made in step S22 to see if the cursor is located in the centering line or not by use of the flag in the centering position information register INF-CN. If "YES" in step S22, the key set process at the centering position is executed in step S23, then the process will return to the main routine.

If "NO" in step S22, a check is made in step S24 to see if the cursor is located at the tab position or not by use of the flag in the tab position information register INF-TB. If "YES" in step S24, the key set process at the tab position is executed in step S25, then the process will return to the main routine. If "NO" in step S24, a check is made in step S26 to see if the cursor exists in the gathering line or not by use of the flag in the gathering position information register INF-GH. If "YES" in step S26, the key set process at the gathering position is executed in step S27, then the process will return to the main routine. In this way, the cursor position is sequentially discriminated and the key set process corresponding to the state of each cursor position is executed.

Figure 31:
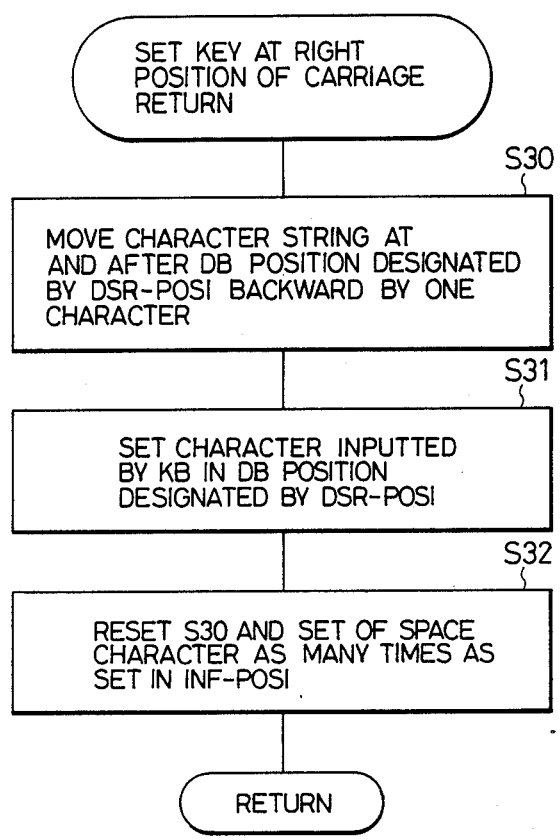

FIG. 31 shows the detailed procedure for the key set process at a right position of the carriage return in step S21 mentioned above. Although an example of the display screen in the case where the cursor CR exceeded the carriage return code position and moved to the right has been shown in FIG. 8, the cursor CR at this time exists in the ninth column in the second line. In addition, the carriage return is located in the first column. Therefore, as shown in FIG. 9, the following data are set into the cursor position information table DSR-INF namely "1" is set into the carriage return information register INF-CR and the cursor position "9" is set into the buffer position cursor register DSR-POSI Further, "8" indicating the magnitude of the deviation amount from the carriage return to the cursor position is set into the deviation amount information register INF-POSI. The display contents on the screen when character "X" was inputted at the cursor position in this state were shown in FIG. 10. However, the state in the buffer memory DB in this state changes as shown in FIG. 11 due to the key set process in FIG. 31. Namely, when comparing with FIG. 7 showing the state of the buffer memory DB before character "X" is inputted, it will be seen that eight space codes and the code of character "X" were inserted between the carriage return code (CR) in the address DB[8]and the carriage return code (CR) in the address DB[9]. In this way, in the state of the buffer memory DB as shown in FIG. 11, even after the carriage return, data can be displayed on the display screen in a similar manner as in the case where characters were freely inputted. Therefore, in this key set processing procedure, first in step S30, the character string at and after the position in the buffer memory DB designated by the buffer cursor DSR-POSI is moved backward by one character. In next step S31, the character code inputted through the keyboard KB is set in the position in the buffer memory DB designated by the buffer cursor DSR-POSI. Subsequently, in step S32, the process in step S30 and the set of space code are repeatedly performed as many times as set in the deviation amount information register INF-POSI. Thereafter, the process routine returns to the main routine.

The above procedure will be further practically explained with reference to FIGS. 7 to 11. The data in and behind the address DB[9]in the buffer memory DB is moved backward by each one character in step S30, then the code of input character "X" is set into the address DB[9]in step S31. Further, in step S32, the data in and behind the address DB[9]is moved backward by each one character similarly as in step S30 and the space code is set into the address DB[9]. By repeatedly performing the movement of the buffer data and the set of the space code only eight times corresponding to the deviation amount of "8" which was set into the deviation amount information register INF-POSI, the contents of the buffer memory DB become as shown in FIG. 11. After completion of the above process, the cursor may be moved to a new position DB[18]of the carriage return. As described above, according to this key set process, even at the positions where the data or the like does not exist in the buffer memory DB after the carriage return, the input characters can be set as if they existed at those positions.

Figure 32:
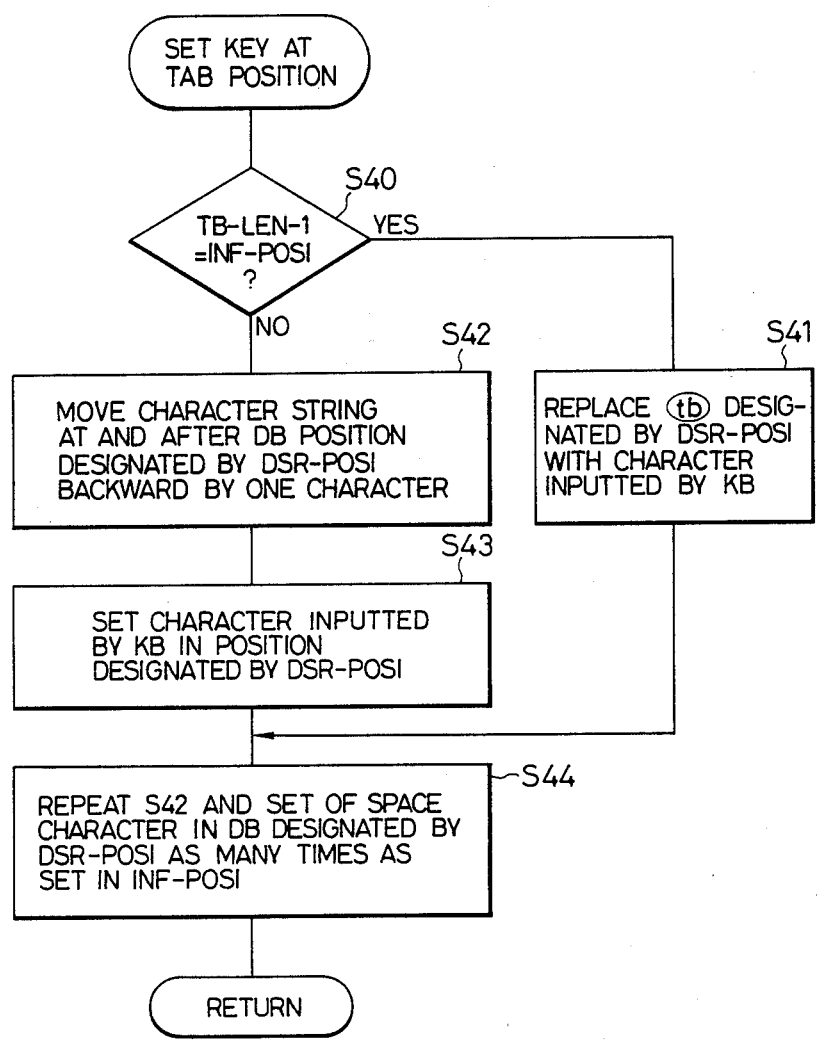

FIG. 32 shows the detailed procedure for the key set process at the tab position in step S25 in FIG. 30. The tab position means the position indicated at "t" in the format line FML in FIG. 12. The area until the tab position "t" is displayed as the spaces on the screen by the tab code (tb) in the buffer memory DB. In this way, the tab code (tb) is dealt as the space code on the display screen for filling the area until the position "t". However, in the buffer memory DB, only one tab code (tb) is stored at the position of one address DB[10]as shown in FIG. 7.

When it is now assumed that the cursor CR exists at the position on the screen as shown in FIG. 12, the buffer cursor DSR-POSI at this time indicates the position of the tab code (tb). On the other hand, the position of the cursor CR at this time has the deviation from the tab code (tb) and this deviation amount is set into the deviation amount information register INF-POSI (refer to FIG. 13). That is, as shown in FIG. 13, "10" indicative of the position DB[10]of the tab code (tb) (see FIG. 11) is set in the buffer cursor register DSR-POSI at this time. In the register INF-TB, "1" indicating that the cursor is located at the tab position is set. On one hand, in the register INF-POSI, "1" representing that the position of the cursor CR is deviated by only "1" from the position of the tab code (tb) in the buffer cursor register DSR-POSI is set. In addition, the number of space codes which exist between the character code (no character exists in case of this embodiment since it corresponds to the left margin) next to the relevant tab code (tb) and the last character code in front of the subsequent tab code (tb) is set into the register TB-LEN, thereby indicating the amount of spaces between the tab positions (the maximum amount is specified by the number of spaces between the tabs). Since four spaces exist in case of FIG. 12, "4" is set in the register TB-LEN.

When character "X" is inputted in the cursor position in such a state as shown in FIG. 12, character "X" is displayed at this cursor position and the display state becomes as shown in FIG. 14 whereby the cursor CR was moved to the right by one character. The state of the buffer memory DB at this time changes to the state as shown in FIG. 15 or 16. In case of FIG. 15, after all of the tab codes (tb) were changed to the space codes, the input character code is set in the cursor position. On the other hand, in case of FIG. 16, the space codes are used as many times as the number of space characters until the character inputting position which the tab code (tb) has, and the input character is set in front of the tab code (tb). FIG. 32 shows the key set processing procedure at the tab position to perform the process as shown in FIG. 16.

The key set process at the tab position in FIG. 32 is executed when "1" indicating that the cursor exists at the tab position is set in the register INF-TB in the cursor position information table DSR-INF. First in step S40, a check is made to see if the value of which "1" was subtracted from the value set in the register TB-LEN coincides with the value in the register INF-POSI indicative of the deviation amount of the cursor position from the tab code (tb) or not. When they are coincident, it means the input character is set in the position of the tab code (tb), while when they are not coincident, it means the cursor indicates another tab position than the tab code (tb).

In step S40, when it is determined that those values coincide, step S41 follows and the tab code (tb) designated by the buffer cursor register DSR-POSI is replaced with the character inputted through the keyboard KB. Next, in step S44, the process to move the character string at and after the position in the buffer memory DB designated by the buffer cursor register DSR-POSI backward by each one character and the process to set the space code in the position in the buffer memory DB designated by the buffer cursor register DSR-POSI are repeatedly performed as many times as set in the register INF-POSI indicative of the deviation amount from the tab code (tb); thereafter, the process routine returns to the main routine.

On the other hand, in step S40, when it is determined that the values do not coincide, step S42 follows and the character string at and after the position in the buffer memory DB designated by the buffer cursor register DSR-POSI is moved backward by each one character. In next step S43, the character inputted through the keyboard KB is set in the position in the buffer memory DB designated by the buffer cursor register DSR-POSI. Then in step S44, a similar process as mentioned above is executed and the process routine returns to the main routine. The character input at the tab position can be carried out in a similar manner as the case at normal character positions due to the above-described key set process.

Figure 33:
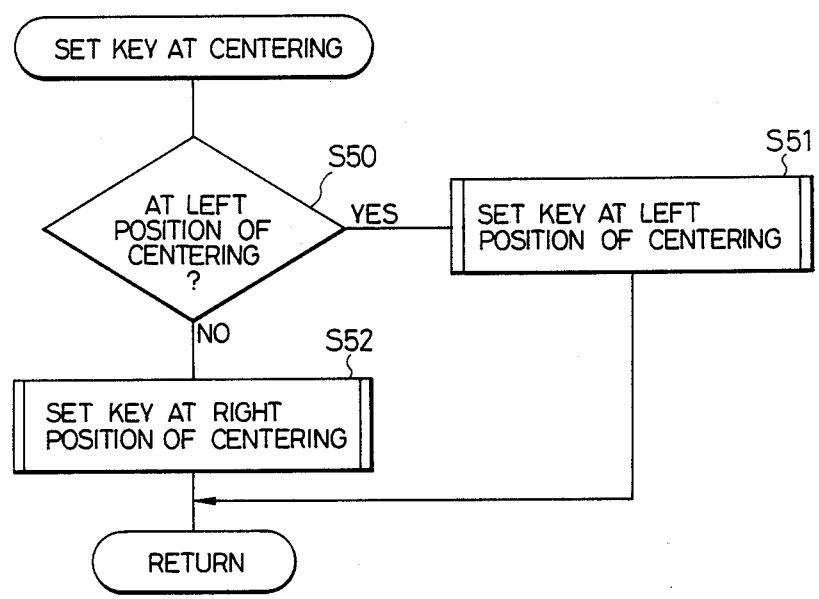
Figure 34:
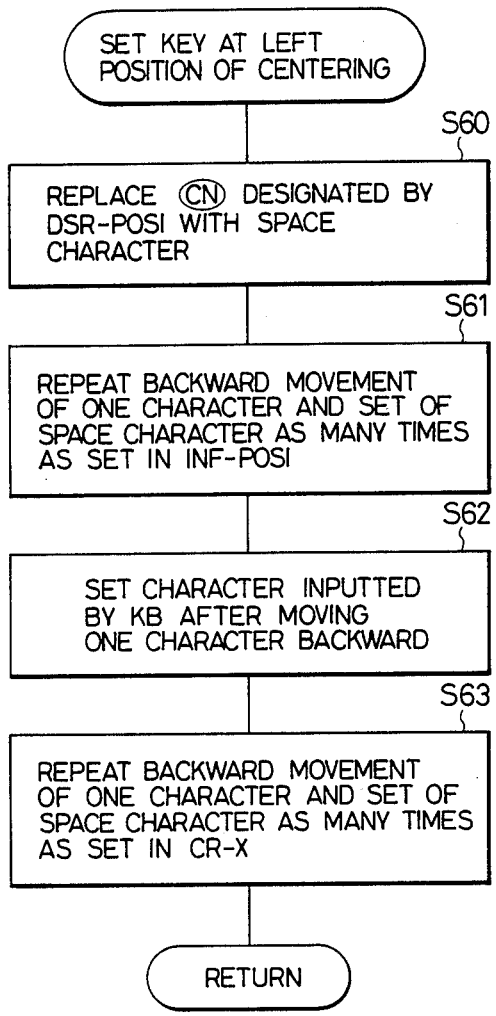
Figure 35:
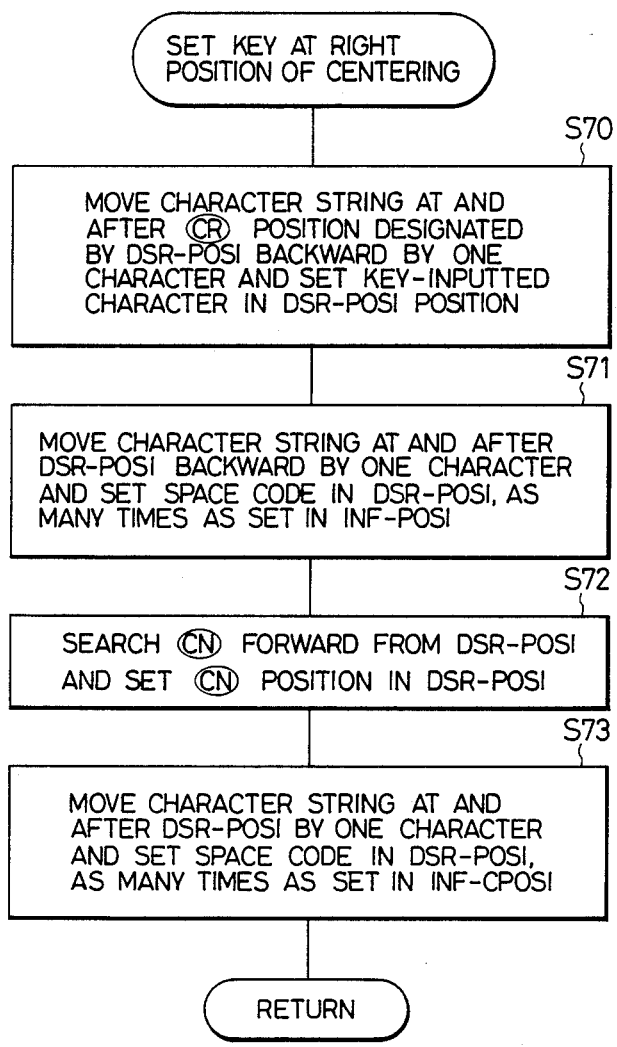

FIGS. 33 to 35 show the centering key set processing procedure in step S23 in FIG. 30. In FIG. 17, CR(1) denotes a position of the cursor at a left position of the centering line and CR(2) indicates a position of the cursor at a right position of the centering line. FIG. 18 shows the contents of the registers when the cursor is located at the left position CR(l) in the centering line. In this case, "2" indicating that the cursor exists at a left position of the centering line (see Table 1) is set in the centering position information register INF-CN. The buffer cursor register DSR-POSI representing the cursor position in the buffer indicates the position "0" of the centering code (CR) (refer to FIG. 7). However, as shown in FIG. 17, the cursor on the display screen is not located at the position of "▷" indicating the centering code. The spaces of five characters which exist in the section between the displayed cursor position and the position of "▷" indicative of the start of centering exist as the deviation amount between the actual displayed cursor position and the internal cursor position. Consequently, "5" representing the deviation amount between the centering start code and the cursor is set in the deviation amount information register INF-POSI. Further, the space amount of "14" on the display screen from the display position of "L" indicative of the left margin to the head character of the centering start position "▷" is set in the register INF-CPOSI indicating the head position of the centering (see FIG. 17).

When character "A" is inputted in the cursor position CR(1) in such a state as shown in FIG. 17, the display state becomes as shown in FIG. 19. The state of the buffer memory DB at this time changes as shown in FIG. 20-1 due to the key set process in FIG. 34. As described above, the input character "A" can be set in the left position of the centering character string without changing the display position of the character string "FREEBIE" that has already been subjected to the centering. On one hand, FIG. 20-2 shows an example of the buffer memory DB in the case where the special code indicative of a plurality of space codes is used. In this case as well, the display state is the same as FIG. 19.

This centering key set process will now be explained with reference to the flow charts in FIGS. 33 and 34. FIG. 33 shows the overall centering key set processing procedure in step S23 in FIG. 30. First, in step S50, a check is made to see if the cursor is located at a left position of the centering or not by use of the value in the register INF-CN. If "YES" in step S50, the key set process at the left position of the centering is executed in step S51. If "NO", the key set process at the right position of the centering is executed in step S52, then the process routine will return to the main routine. When the cursor is located at a left position in the centering line, "2" is set in the register INF-CN, so that the discrimination in step S50 can be easily performed.

FIG. 34 shows the details of the key set process at the left position of the centering in step S51 in FIG. 33. Now, assuming that the contents of the registers are as shown in FIG. 18 mentioned before, first in step S60, the buffer cursor register DSR-POSI designates the position "0" of the centering code (CN), so that the centering code (CN) at this position is replaced with the space code. Next in step S61, the process to move the character string which was set in the buffer memory DB at and after the position "0" designated by the buffer cursor register DSR-POSI backward by each one character and the process to set the space code in the position of the buffer memory DB designated by the buffer cursor register DSR-POSI are repeatedly executed as many times as the value of "5" which was set in the deviation amount information register INF-POSI. In this case, if the special code indicative of a plurality of spaces is set in place of setting a plurality of space codes, the state of the buffer memory will become as shown in FIG. 20-2.

Next in step S62, the input character code "A" inputted through the keyboard KB is set in the position "0" designated by the buffer cursor register DSR-POSI after moving the character string at and after the position indicated by the buffer cursor register DSR-POSI by one character in a similar manner as mentioned above. Further in step S63, the process to move the character string at and after the position designated by the buffer cursor register DSR-POSI backward by each one character and the process to set the space code in the position designated by the buffer cursor register DSR-POSI are repeatedly carried out as many times as the value "8" in the register CR-X indicative of the number of characters in the section from the cursor position to the left margin position, then the process routine returns to the main routine. Due to the execution of the above key set process, the contents of the buffer memory DB are changed as shown in FIG. 20-1 and displayed as shown in FIG. 19 (see FIG. 17).

Then, the key set process when the cursor exists at a right position of the centering line will be explained. FIG. 21 shows the display state when character "X" was inputted in the cursor position CR(2) at the right position of the centering line in FIG. 17. In this case, the input character "X" is inputted and displayed at the right position of the centering without changing the display position of the character string "FREEBIE" which has been subjected to the centering. Although FIG. 22 shows the contents of the respective registers before this key set process is executed, "22" indicating the position of the carriage return code (CR) at the end of the centering line is set in the buffer cursor register DSR-POSI representative of the internal cursor position, while "3" indicating that the cursor exists at the right position of the centering line is set in the centering position information register INF-CN (refer to Table 1). Also, the deviation amount "4" between the displayed cursor position and the carriage return code (CR) is set in the deviation amount information register INF-POSI. The deviation amount "14" between the centering code (CN) and the left margin is set in the register INF-CPOSI. The key set process at the right position of the centering is executed using the above-mentioned cursor position information.

FIG. 35 shows the details of the key set process at the right position of the centering in step S52 in FIG. 33. When it is now assumed that the contents of the registers are as shown in FIG. 22, first in step S70, the buffer cursor register DSR-POSI indicative of the position of the internal cursor shows the position "22" (see FIG. 17) of the carriage return code (CR) of the centering line. Therefore, after the character string in the buffer memory DB at and after the position designated by the buffer cursor register DSR-POSI was moved backward by each one character, the character inputted through the keyboard KB is set in the position designated by the buffer cursor register DSR-POSI. Next step S71 follows and the process to move the character at the position designated by the buffer cursor register DSR-POSI backward by one character and the process to set the space code in the position designated by the buffer cursor register DSR-POSI are repeatedly executed as many times as the value "4" in the register INF-POSI indicative of the deviation amount between the displayed cursor position and the position of the carriage return code (CR).

Subsequently in step S72, the process to search the position of the centering code (CN) in the buffer memory DB forward from the position designated by the buffer cursor register DSR-POSI is executed. The searched position "0" of the centering code (CN) is set as a new value in the buffer cursor register DSR-POSI. Next in step S73, the process to set the space code in the position designated by the buffer cursor register DSR-POSI and the process to move the character string at and after the position designated by the buffer cursor register DSR-POSI backward by each one character are repeated at the new position "0" designated by the buffer cursor register DSR-POSI as many times as the value "14" which was set in the deviation amount information register INF-POSI. Thereafter, the process routine returns to the main routine. The code (CN) is replaced with the space due to this process in step S73.

As shown in FIG. 23, character "X" is set in the buffer memory DB due to the above procedure. In this way, the character input at the right position of the centering line can be performed without changing the display position of the character string that was subjected to the centering. However, the centering code (CN) does not exist in the buffer memory DB any more after those input processings have been once carried out, so that the same key set process as mentioned above regarding the same line is not executed again.

The character input processing at a left position of the gathering will then be explained. FIG. 24 shows an example of the display screen when the cursor CR exists at a left position of the gathering. FIG. 25 shows the contents of the respective registers at this time, and "2" indicating that the cursor is located at a left position of the gathering is set in the register INF-GH (see Table 1), while the deviation amount "6" between the displayed position of the cursor CR and the gathering code (GH) is set in the register INF-POSI.

Figure 36:
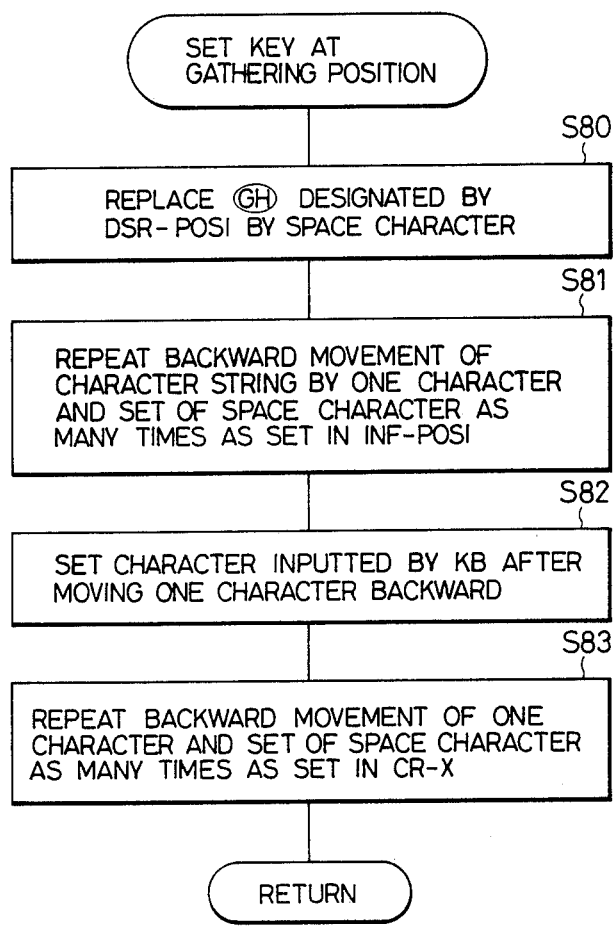

FIG. 36 shows the details of the gathering key set process in step S27 in FIG. 30. When it is now assumed that the contents of the registers are as shown in FIG. 25 mentioned above, first in step S80, the gathering code (GH) at the position "185" designated by the buffer cursor register DSR-POSI is replaced by the space code. Next in step S81, the process to move the character string at and after the position designated by the buffer cursor register DSR-POSI backward by each one character and the process to set the space code in the position designated by the buffer cursor register DSR-POSI are repeatedly executed as many times as the value "6" which was set in the register INF-POSI.

Subsequently in step S82, the character string at and after the position designated by the buffer cursor register DSR-POSI is further moved backward by each one character, then character "1" inputted through the keyboard KB is set in the position designated by the buffer cursor register DSR-POSI (see FIG. 26).

Further, step S83 follows, and the process to move the character string at and after the position designated by the buffer cursor register DSR-POSI backward by each one character and the process to set the space code in the position designated by the buffer cursor register DSR-POSI are repeatedly performed as many times as the value "17" which was set in the register CR-X. Thereafter, the process routine returns to the main routine.

The display state on the display screen becomes as shown in FIG. 26 and the contents of the buffer memory DB become as shown in FIG. 27 due to the above-described key set process. In this way, since the gathering code (GH) is replaced by the space code, the character input in the gathering line can be carried out without changing the display position of the gathering character string.

Figure 37:
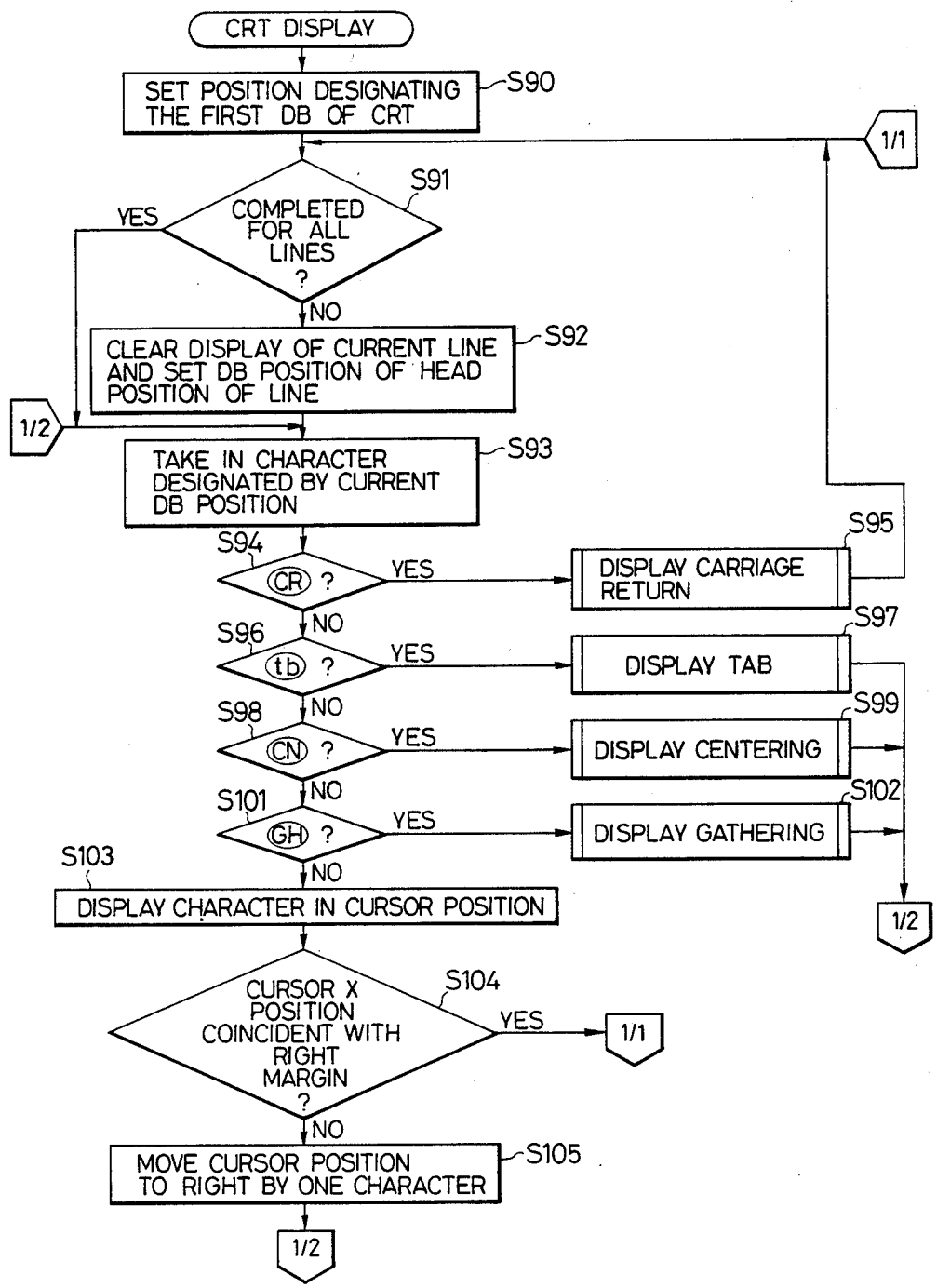
Figure 38B:
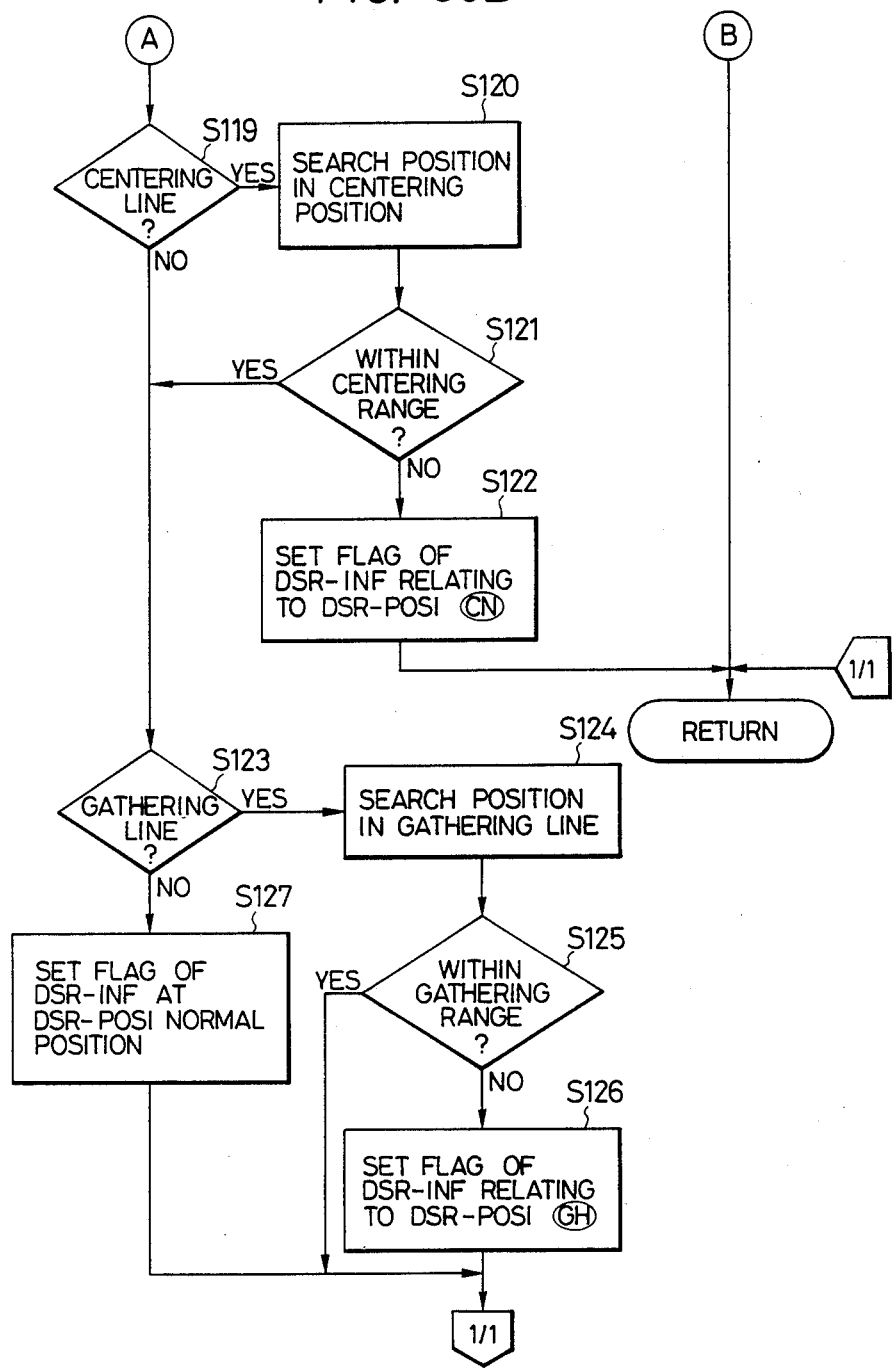

FIG. 37 shows the details of the CRT display process shown in step S6 in FIG. 28. FIG. 38 shows the details of the cursor information check process shown in step S7 in FIG. 28. The CRT display process and cursor information check process can be performed by applying general technologies and they are not directly related to the invention; therefore, their detailed descriptions are omitted.

In this embodiment, in the key set process in the special code line, the deviation amount between the cursor position on the screen and the position of the special code line in the buffer memory is replaced by the space code and set into the buffer memory. However, in place of this space code, the special code representing a plurality of spaces may be used as shown in FIG. 20-2. In case of using such a special code, the amount of memories which are set in the buffer memory can be reduced as compared with that when the space codes are used. Therefore, there is an advantage such that the buffer memory can be further effectively utilized.

What is claimed is:

1. An image processing apparatus comprising:
    input means for inputting a special code, relating to the position of characters to be displayed, and a character code string;
    storage means for continuously storing, as addresses, the special code and the character code string subsequent to the special code input by said input means;
    display means for displaying a character string on the basis of the special code stored in said storage means; and
    control means for controlling said input means such that the special code is displayed as at least one space and such that a character string corresponding to the character code string subsequent to the special code is displayed subsequently to the space and for controlling said storage means such that when a character code is input at the space by said input means, a space code is inserted subsequent to the special code in said storage means and the space code is stored with the input character code.

2. An image processing apparatus according to claim 1, wherein a kind of said special code includes either of carriage return code, tab code, centering code, gathering code, or space code.

3. An image processing apparatus comprising:
character input means for inputting a carriage return code and a character code string;
storage means for continuously storing, as addresses, the carriage return code and the character code string subsequent to the carriage return code input by said character input means;
display means for beginning a new line in the character string subsequent to the carriage return code and displaying the character code string on a display screen; and
input control means for controlling said display means such that the carriage return code is displayed as at least one space and such that a character string corresponding to the character code string subsequent to the carriage return code is displayed subsequent to the space and for controlling said storage means such that when a character code is input at the space by said input means, a space code is inserted subsequent to the carriage return code in said storage means and the space code is stored with the input character code.

4. An image processing apparatus according to claim 3, wherein said input control means has registers for performing the display control regarding the carriage return.

5. An image processing apparatus comprising:
character input means for inputting a predetermined tab code indicative of setting of a tab and character code string;
storage means for continuously storing, as addresses, the tab code and the character code string subsequent to the tab code input by said character input means;
display means for displaying the tab code as spaces on a display screen at a tab position corresponding to the tab; and
input control means for controlling said display means such that a character string corresponding to the character code string subsequent to the tab code is displayed subsequent to the spaces and for controlling said storage means such that when a character code is input at the spaces by said input means, a space code is inserted subsequent to the tab code in said storage means and the space code is stored with the input character code.

6. An image processing apparatus comprising:
character input means for inputting a predetermined centering code indicative of setting of a centering code and character code string;
storage means for continuously storing, as addresses, the centering code and the character code string subsequent to the centering code input by said character input means;
display means for displaying a character string sandwiched by a pair of the centering codes on a display screen; and
input control means for controlling said display means such that the centering code is displayed as at least one space and such that a character string corresponding to the character code string subsequent to the centering code is displayed subsequent to the space and for controlling said storage means such that when a character code is input at the space by said input means, a space code is inserted subsequent to the centering code in said storage means and the space code is stored with the input character code.

7. An image processing apparatus comprising:
character input means for inputting a predetermined gathering code indicative of setting of setting of a gathering and a character code string;
storage means for continuously storing, as addresses, the gathering code and the character code string subsequent to said gathering code input by said character input means;
display means for displaying a character string sandwiched by a pair of the gathering codes on a display screen; and
input control means for controlling said display means such that the gathering code is displayed as at least one space and such that a character string corresponding to the character code string subsequent to the gathering code is displayed subsequent to the space and for controlling said storage means such that when a character code is input at the space by said input means, a space code is inserted subsequent to the gathering code in said storage means and the space code is stored with the input character code.

* * * * *

UNITED STATES PATENT AND TRADEMARK OFFICE
CERTIFICATE OF CORRECTION

PATENT NO. : 4,924,409

DATED : May 8, 1990

INVENTOR(S) : Kouji Fukunaga

It is certified that error appears in the above-identified patent and that said Letters Patent is hereby corrected as shown below:

COVER PAGE:

[73] "Canon Kabushiki Kasiah" should read --Canon Kabushiki Kaisha--.

COLUMN 2:

Line 24, "is" should read --are--.

COLUMN 5:

Line 16, "therefore," should read --therefore--;
Line 25, "and" should read --as--;
Line 42, "DSR-FORM" should read --DSR-FORM.--.

COLUMN 8:

Line 62, "S7 and S6" should read -- (S7) and (S6) --.

COLUMN 9:

Line 22, "executed" should read --executed.--.

UNITED STATES PATENT AND TRADEMARK OFFICE
CERTIFICATE OF CORRECTION

PATENT NO. : 4,924,409

DATED : May 8, 1990

INVENTOR(S) : Kouji Fukunaga

It is certified that error appears in the above-identified patent and that said Letters Patent is hereby corrected as shown below:

COLUMN 11:

Line 4, "DSR-POSI" should read --DSR-POSI.--;
    Line 30, "code" should read --codes--.

COLUMN 18:

Line 27, "of setting" (second occurrence) should be deleted.

Signed and Sealed this

Seventeenth Day of December, 1991

Attest:

HARRY F. MANBECK, JR.

*Attesting Officer*      *Commissioner of Patents and Trademarks*